United States Patent
Damnjanovic et al.

(10) Patent No.: US 8,917,593 B2
(45) Date of Patent: Dec. 23, 2014

(54) RANDOM ACCESS DESIGN IN A MULTIPLE COMPONENT CARRIER COMMUNICATION NETWORK

(75) Inventors: Jelena M. Damnjanovic, Del Mar, CA (US); Peter Gaal, San Diego, CA (US); Rajat Prakash, La Jolla, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 540 days.

(21) Appl. No.: 13/049,212

(22) Filed: Mar. 16, 2011

(65) Prior Publication Data

US 2012/0063302 A1    Mar. 15, 2012

Related U.S. Application Data

(60) Provisional application No. 61/315,372, filed on Mar. 18, 2010.

(51) Int. Cl.
*H04L 12/26* (2006.01)
*H04W 4/00* (2009.01)
*H04W 74/08* (2009.01)

(52) U.S. Cl.
CPC .............................. *H04W 74/0833* (2013.01)
USPC ....................................... 370/228; 455/422.1

(58) Field of Classification Search
CPC ................................................. H04W 74/0833
USPC ........................................ 455/422.2; 370/228
See application file for complete search history.

(56) References Cited

U.S. PATENT DOCUMENTS

| | | | |
|---|---|---|---|
| 8,588,150 B2 | 11/2013 | Luo et al. | |
| 2011/0159867 A1* | 6/2011 | Kuo | 455/422.1 |
| 2011/0194516 A1 | 8/2011 | Aiba et al. | |
| 2012/0263129 A1* | 10/2012 | Noh et al. | 370/329 |

FOREIGN PATENT DOCUMENTS

| | | |
|---|---|---|
| CN | 101478824 A | 7/2009 |
| WO | WO-2010017475 | 2/2010 |
| WO | WO-2010019009 A2 | 2/2010 |
| WO | WO-2010027035 A1 | 3/2010 |

OTHER PUBLICATIONS

Catt, "Consideration on RACH in CA", Feb. 22-26, 2010, 3GPP, R2-101058, pp. 1-4.*
Huawei, "Remaining issues on Cross-Carrier PDCCH Indication", Jan. 18-22, 2010, 3GPP, R1-100241, pp. 1-4.*
Zte, "Impact analysis of multiple TA", Feb. 16 2010, 3GPP, R2-101091, pp. 1-3.*
Catt, "Consideration on RACH procedure and RLF", Nov. 9, 2009, 3GPP, R2-096506, pp. 1-2.*

(Continued)

*Primary Examiner* — Jung Park
*Assistant Examiner* — Albert Shih

(57) ABSTRACT

User equipment, systems, apparatuses, methods and/or computer program products are provided to facilitate random access procedures in a wireless communication network. The selection and utilization of uplink and downlink component carriers for conducting contention-free and contention-based random access procedures is facilitated in a multiple component carrier system, where a user equipment is configured with multiple uplink and downlink component carriers.

67 Claims, 15 Drawing Sheets

(56) References Cited

OTHER PUBLICATIONS

ETSI, "LTE; Evolved Universal Terrestrial Radio Access (E-UTRA) and Evolved Universal Terrestrial Radio Access Network (E-UTRAN); Overall description; Stage 2 (3GPP TS 36.300 version 9.2.0 Release 9)", Feb. 1, 2010, 3GPP, pp. 1-181.*
Garcia, Luis G. U. et al., "Autonomous component carrier selection: interference management in local area environement for LTE-advanced", Sep. 1, 2009, IEEE Communications Magazine, IEEE Service Center, Piscataway, US, vol. 47, No. 9, XP011283372, ISSN: 0163-6804, DOI: 10.1109/MCOM.2009.5277463, pp. 110-116.*
CATT: "Consideration on RACH in CA", 3GPP Draft; R2-101058, 3rd Generation Partnership Project (3GPP), Mobile Competence Centre ; 650, Route Des Lucioles ; F-06921 Sophia-Antipolis Cedex ; France, vol. RAN WG2, no. San Francisco, USA; Feb. 22, 2010, Feb. 12, 2010, XP050421372, [retrieved on Feb. 12, 2010].
CATT: "Consideration on RACH procedure and RLF", 3GPP Draft; R2-096506, 3rd Generation Partnership Project (3GPP), Mobile Competence Centre ; 650, Route Des Lucioles ; F-06921 Sophia-Antipolis Cedex ; France, no. Jeju; Nov. 9, 2009, XP050391093, [retrieved on Nov. 3, 2009].
Huawei: "Remaining issues on Cross-Carrier PDCCH Indication", 3GPP Draft; R1-100241, 3rd Generation Partnership Project (3GPP), Mobile Competence Centre ; 650, Route Des Lucioles ; F-06921 Sophia-Antipolis Cedex ; France, vol. RAN WGI, no. Valencia, Spain; Jan. 18, 2010, Jan. 12, 2010, XP050417928, [retrieved on Jan. 12, 2010].
International Search Report and Written Opinion—PCT/US2011/028899, ISA/EPO—Jul. 4, 2011.
LTE; Evolved Universal Terrestrial Radio Access (E-UTRA) and Evolved Universal Terrestrial Radio Access Network (E-UTRAN); Overall description; Stage 2 (3GPP TS 36.300 version 9.2.0 Release 9), Technical Specification, European Telecommunications Standards Institute (ETSI), 650, Route Des Lucioles ; F-06921 Sophia-Antipolis ; France, vol. 3GPP RAN 2, No. V9.2.0, Feb. 1, 2010, XP014046900, p. 56-58.
Nokia Siemens Networks: "Stage 2 description of Carrier Aggregation", 3GPP TSG-RAN WG2 Meeting #69 Change Request 36.300 CR 0190, No. R2-101846, Mar. 7, 2010, pp. 1-18, XP002642677, San Francisco, U.S.A.
ZTE: "Impact analysis of multiple TA", 3GPP Draft; R2-101091, 3rd Generation Partnership Project (3GPP), Mobile Competence Centre ; 650, Route Des Lucioles ; F-06921 Sophia-Antipolis Cedex ; France, vol. RAN WG2, no. San Francisco, USA; Feb. 22, 2010, Feb. 16, 2010, XP050421752, [retrieved on Feb. 16, 2010].
Garcia L G U, et al., "Autonomous component carrier selection: interference management in local area environments for LTE-advanced", IEEE Communications Magazine, IEEE Service Center, Piscataway, US, vol. 47, No. 9, Sep. 1, 2009, pp. 110-116, XP011283372, ISSN: 0163-6804, DOI: DOI:10.1109/MCOM.2009.5277463.
LTE; Evolved Universal Terrestrial Radio Access (E-UTRA) and Evolved Universal Terrestrial Radio Access Network (E-UTRA); Overall description; Stage 2 (3GPP TS 36.300 version 8.9.0 Release 8), Technical Specification, European Telecommunications Standards Institute (ETSI), 650, Route Des Lucioles ; F-06921 Sophia-Antipolis ; France, No. V8.9.0, Jul. 1, 2009, XP014044751.
Taiwan Search Report—TW100109408—TIPO—Jul. 19, 2013.
ZTE: "Discussion on contention resolution of CB transmission", 3GPP Draft; R2-101101, 3rd Generation Partnership Project (3GPP), Mobile Competence Centre ; 650, Route Des Lucioles ; F-06921 Sophia-Antipolis Cedex ; France, vol. RAN WG2, no. San Francisco, USA; Feb. 22, 2010, Feb. 14, 2010, XP050421455, [retrieved on Feb. 14, 2010].

* cited by examiner

RANDOM ACCESS DESIGN IN A MULTIPLE COMPONENT CARRIER COMMUNICATION NETWORK

The present application claims the benefit of and priority to U.S. Provisional Patent Application Ser. No. 61/315,372 entitled "Random Access Design For Carrier Aggregation," filed Mar. 18, 2010, the entirety of which is hereby incorporated by reference.

FIELD OF INVENTION

The present application relates generally to the field of wireless communications and, more particularly to facilitating random access procedures in wireless communication systems.

BACKGROUND

This section is intended to provide a background or context to the disclosed embodiments. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Wireless communication systems are widely deployed to provide various types of communication content such as voice, data, and other content. These systems may be multiple-access communication systems capable of supporting communication with multiple users by sharing the available system resources (e.g., bandwidth and transmit power). Examples of such multiple-access communication systems include code division multiple access (CDMA) systems, time division multiple access (TDMA) systems, frequency division multiple access (FDMA) systems, Long Term Evolution (LTE) systems (including 3GPP systems), and orthogonal frequency division multiple access (OFDMA) systems.

Generally, a wireless multiple-access communication system can simultaneously support communication for multiple wireless terminals. Each terminal, or user equipment (UE), communicates with one or more base stations through transmissions on forward and reverse links. The forward link (or downlink) refers to the communication link from the base stations to the user equipment, and the reverse link (or uplink) refers to the communication link from the user equipment to the base stations. This communication link can be established through a single-in-single-out, multiple-in-single-out or a multiple-in-multiple-out (MIMO) system.

In some wireless communication systems, such as LTE systems, a random access procedure is utilized to establish or re-establish a connection between a user equipment and a base station (or eNodeB). A random access procedure may serve a number of purposes, such as to allow access when establishing a radio link (e.g., moving from an RRC_IDLE to an RRC_CONNECTED state), to re-establish a radio link upon a radio link failure, to establish uplink synchronization for a user equipment which has lost or has not acquired uplink synchronization, to facilitate handover operations when a new synchronization with new cell needs to be established, and the like. SUMMARY This section is intended to provide a summary of certain exemplary embodiments and is not intended to limit the scope of the disclosed embodiments.

The present disclosure relates to systems, methods, apparatuses and computer program products that facilitate contention-free and contention based random access procedures in multiple component carrier wireless communication networks. One exemplary aspect relates to a method for wireless communication that comprises receiving a request for a random access procedure at a user equipment. The user equipment can be configured to operate with a plurality of component carriers including uplink and downlink component carriers in a wireless communication network. According to this exemplary method, which can be used as part of a contention-free random access procedure by the user equipment, the request is received on a first downlink component carrier of the plurality of component carriers. The method further includes selecting an uplink component carrier from among the plurality of component carriers for transmitting a random access message based on an association between the uplink and downlink component carriers. The method also can include transmitting the random access message on the selected uplink component carrier, and receiving a response to the transmitted random access message.

In one aspect of the disclosure, the selected uplink component carrier is associated with the first downlink component carrier in accordance with system information block 2 (SIB2) signaling. In another aspect, the selected uplink component carrier is associated with the first downlink component carrier in accordance with a user-equipment-specific signaling that links the first selected uplink component carrier to the selected uplink component carrier. The plurality of the component carriers may include a primary component carrier and one or more secondary component carriers, and the selected uplink component carrier can be the primary uplink component carrier.

In one aspect, the plurality of the component carriers includes a primary uplink component carrier and one or more secondary uplink component carriers, and the first downlink component carrier is associated with the primary uplink component carrier. In another aspect, the plurality of the component carriers includes a primary uplink component carrier and one or more secondary uplink component carriers, and the selected uplink component carrier is a secondary uplink component carrier. The user equipment can select a secondary uplink component carrier with an uplink timing advance value that is substantially the same as the uplink timing advance value associated with the primary uplink component carrier. In another example, the user equipment can select a secondary uplink component carrier with a different uplink timing advance value than the uplink timing advance value of the primary uplink component carrier acquire uplink synchronization for the primary uplink component carrier to enable proper transmissions of uplink control information.

According to one aspect, the request that is received at the user equipment includes information relating to the association between the first downlink component carrier and an indicated uplink component carrier, and the indicated uplink component carrier is selected as the uplink component carrier. In one example, the response to the transmitted random access message is received on a second downlink component carrier that is linked to the indicated uplink component carrier in accordance with system information block 2 (SIB2) signaling. In another example, the response to the transmitted random access message is received on the first downlink component carrier. In yet another example, the received response is a scrambled response, and the user equipment descrambles the response according to a special signature sequence number or a reserved random access radio network temporary identifier (RA-RNTI) to ascertain a particular uplink component carrier.

Another aspect relates to a method for wireless communication which includes configuring a plurality of component carriers for use by a user equipment in a wireless communication network. The plurality of component carriers may include uplink and downlink component carriers. This method may be used as part of a contention-free random access procedure by an eNodeB of the wireless communication network where each uplink component carrier is associated with at least one downlink component carrier. The method further includes selecting a downlink component carrier and transmitting a request for a random access procedure to the user equipment on the selected downlink component carrier, receiving a random access message from the user equipment on an uplink component carrier of the plurality of component carriers, where the uplink component carrier is identified by the user equipment, and transmitting a response to the user equipment.

In another aspect, the plurality of the component carriers includes a primary component carrier and one or more secondary component carriers, the selected downlink component carrier is the primary downlink component carrier, and the random access message is received on the primary uplink component carrier.

Another aspect relates to a user equipment that comprises a processor, and a memory that stores processor-executable code. The processor executable code, when executed by the processor, configures the user equipment to receive a request for a random access procedure when the user equipment is configured to operate with a plurality of component carriers which includes uplink and downlink component carriers of a wireless communication network. The request can be received on a first downlink component carrier of the plurality of component carriers. The processor executable code may also configure the user equipment to select an uplink component carrier from among the plurality of component carriers for transmitting a random access message based on an association between the uplink and downlink component carriers, transmit the random access message on the selected uplink component carrier, and receive a response to the transmitted random access message.

Another aspect relates to a device that comprises a processor and a memory that stores processor-executable code. The processor executable code, when executed by the processor, causes the device to configure a plurality of component carriers for use by a user equipment in a wireless communication network. The plurality of component carriers may include uplink and downlink component carriers for which each uplink component carrier is associated with at least one downlink component carrier. The processor executable code, when executed by the processor, configures the device to select a downlink component carrier and transmit a request for a random access procedure to the user equipment on the selected downlink component carrier. The processor executable code, when executed by the processor, enables the device to receive a random access message from the user equipment on an uplink component carrier of the plurality of component carriers, where the uplink component carrier is identified by the user equipment, and to transmit a response to the user equipment.

Another aspect relates to a device that includes means for receiving a request for a random access procedure at a user equipment, where the user equipment is configured to operate with a plurality of component carriers comprising uplink and downlink component carriers of a wireless communication network, and where the request is received on a first downlink component carrier of the plurality of component carriers. The device also includes means for selecting an uplink component carrier for transmitting a random access message based on an association between the uplink and downlink component carriers. The device also includes means for transmitting the random access message on the selected uplink component carrier, and means for receiving a response to the transmitted random access message.

Another aspect relates to a device that includes means configuring a plurality of component carriers for use by a user equipment in a wireless communication network, where the plurality of component carriers include uplink and downlink component carriers and where each uplink component carrier is associated with at least one downlink component carrier. The device also includes means for selecting a downlink component carrier and means for transmitting a request for a random access procedure to the user equipment on the selected downlink component carrier. The device can include means for receiving a random access message from the user equipment on an uplink component carrier of the plurality of component carriers, where the uplink component carrier is identified by the user equipment, and also means for transmitting a response to the user equipment.

Another aspect relates to a computer program product, embodied on a non-transitory computer-readable medium, that includes program code for receiving a request for a random access procedure at a user equipment, where the user equipment is configured to operate with a plurality of component carriers including uplink and downlink component carriers of a wireless communication network, and where the request is received on a first downlink component carrier of the plurality of component carriers. The computer program product also includes program code for selecting an uplink component carrier from among the plurality of component carriers for transmitting a random access message based on an association between the uplink and downlink component carriers, and program code for transmitting the random access message on the selected uplink component carrier. The computer program product further includes program code for receiving a response to the transmitted random access message.

Another aspect relates to a computer program product, embodied on a non-transitory computer-readable medium, that includes program code for configuring a plurality of component carriers for use by a user equipment in a wireless communication network, where the plurality of component carriers comprise uplink and downlink component carriers and where each uplink component carrier is associated with at least one downlink component carrier. The computer program product also includes program code for selecting a downlink component carrier and program code for transmitting a request for a random access procedure to the user equipment on the selected downlink component carrier. The computer program product further includes program code for receiving a random access message from the user equipment on an uplink component carrier of the plurality of component carriers, where the uplink component carrier is identified by the user equipment, and program code for transmitting a response to the user equipment.

Another aspect relates to a method for wireless communication that includes selecting an uplink component carrier for transmitting a random access request by a user equipment in a wireless communication network, where the user equipment is configured to operate with a plurality of component carriers comprising uplink and downlink component carriers. The method, which can be used as part of contention-based random access procedure by a user equipment, further includes transmitting the random access request on the selected uplink component carrier, and receiving a response to the random access request on a first downlink component carrier in the plurality of component carriers, where the first downlink component carrier is linked with the selected uplink component carrier.

In one aspect, the user equipment is configured to use a random access channel on the selected uplink component carrier. In another aspect, as part of selecting the uplink component carrier, the user equipment identifies the first downlink component carrier from an active subset of the plurality of component carriers configured for use by the user equipment. The first downlink component carrier can be linked to the selected uplink component carrier in accordance with system information block 2 (SIB2) signaling or, the first downlink component carrier can be linked to the selected uplink component carrier in accordance with a user-equipment-specific signaling. In the scenario where a user-equipment-specific signaling is used, user equipment can identify the first downlink component carrier in accordance with a random access channel (RACH) resources selected from a group including: a time resource, a frequency resource, and a signature space resource.

According to one aspect, the plurality of the component carriers can include a primary component carrier and one or more secondary component carriers, the selected uplink component carrier is the primary uplink component carrier, and the first downlink component carrier is the primary downlink component carrier. In another embodiment, the plurality of the component carriers include a primary component carrier and one or more secondary component carriers, the selected uplink component carrier is the primary uplink component carrier, and the first downlink component carrier is a secondary downlink component carrier.

In another aspect, the plurality of the component carriers can include a primary component carrier and one or more secondary component carriers, and the user equipment selects a secondary uplink component carrier with substantially the same uplink timing advance value as the primary uplink component carrier. In the scenario where the first downlink component carrier is a secondary downlink component carrier, the user equipment can acquire uplink synchronization for each secondary uplink component carriers within an active subset of the plurality of component carriers configured for use by the user equipment when the uplink timing advance value associated with each secondary uplink component carrier is different from the uplink timing advance value associated with the primary uplink component carrier. The user equipment can also acquire uplink synchronization for a one or more secondary uplink component carriers within the active subset when the uplink timing advance value associated with the one or more secondary uplink component carriers is different from the uplink timing advance value associated with the primary uplink component carrier, where the one or more secondary uplink component carriers are identified by an entity in the wireless network other than the user equipment.

In another aspect, the plurality of the component carriers can include a primary component carrier and one or more secondary component carriers, where the selected uplink component carrier is the primary uplink component carrier and the first downlink carrier is determined to be unreliable. The user equipment newly selects a secondary uplink component carrier with substantially the same uplink timing advance value as the primary uplink component carrier for the transmission of the random access request. The plurality of the component carriers can include a primary component carrier and one or more secondary component carriers, the selected uplink component carrier is the primary uplink component carrier, the first downlink carrier is determined to be unreliable, and a new primary uplink component carrier, associated with a reliable downlink component carrier, is configured for the user equipment.

According to another aspect, the plurality of component carriers can include a primary component carrier and one or more secondary component carriers, the selected uplink component carrier can be the primary uplink component carrier, the first downlink carrier is determined to be unreliable, and the user equipment receives a contention-free random access request on a reliable downlink component carrier. The request can include an indication as to an association between the primary uplink component carrier and the reliable downlink component carrier. In one aspect, the plurality of the component carriers includes a primary component carrier and one or more secondary component carriers, the selected uplink component carrier is the primary uplink component carrier, and the user equipment declares a radio link failure when the primary uplink component carrier is determined to be unreliable.

In another aspect, the plurality of the component carriers includes a primary component carrier and one or more secondary component carriers, and the user equipment selects a secondary uplink component carrier for transmitting the random access request. The selected uplink component carrier can be detected as being unreliable, the first downlink component carrier can be detected as being reliable, and the user equipment can acquire uplink synchronization for an uplink component carrier that is linked to the first downlink component carrier. In another exemplary example, the selected uplink component carrier can be detected as being unreliable, the first downlink component carrier can be detected as being reliable, and the user equipment can iteratively attempt to acquire uplink synchronization acquisition for each uplink component carrier within an active subset of the plurality of component carriers until uplink synchronization for at least one uplink component carrier is successfully attained. The user equipment can declare or provide a radio link failure if none of the synchronization acquisition attempts are successful.

Another aspect relates to a method for wireless communication that includes configuring a plurality of component carriers for use by a user equipment in a wireless communication network, where the plurality of component carriers includes uplink and downlink component carriers and where each uplink component carrier is associated with at least one downlink component carrier. This exemplary method, which can be used as part of a contention-based random access procedure by an eNodeB, further includes receiving a random access request from the user equipment on a first uplink component carrier of the plurality of component carriers, where the first uplink component carrier is identified by the user equipment. The method also includes transmitting a response on a first downlink component carrier of the plurality of component carriers, where the first downlink component carrier is linked to the first uplink component carrier.

Another aspect relates to a user equipment that comprises a processor and a memory that stores processor-executable code. The processor executable code, when executed by the processor, configures the user equipment to select an uplink component carrier for transmitting a random access request where the user equipment is configured to operate with a plurality of component carriers comprising uplink and downlink component carriers. The processor executable code, when executed by the processor, also configures the user equipment to transmit the random access request on the selected uplink component carrier, and to receive a response to the random access request on a first downlink component carrier in the plurality of component carriers, where the first downlink component carrier is linked with the selected uplink component carrier.

In one aspect, the processor executable code, when executed by the processor, configures the user equipment to acquire uplink synchronization for each secondary uplink component carriers within an active subset of the plurality of component carriers configured for use by the user equipment when the uplink timing advance value associated with each secondary uplink component carrier is different from the uplink timing advance value associated with the primary uplink component carrier. In another aspect, the processor executable code, when executed by the processor, configures the user equipment to acquire uplink synchronization for a one or more secondary uplink component carriers within an active subset of the plurality of component carriers configured for use by the user equipment when the uplink timing advance value associated with of the one or more secondary uplink component carriers is different from the uplink timing advance value associated with the primary uplink component carrier, where the one or more secondary uplink component carriers are identified by an entity in the wireless network other than the user equipment.

Another aspect relates to a user equipment that comprises a processor and a memory that stores processor-executable code. The processor executable code, when executed by the processor, configures a user equipment to utilize a plurality of component carriers, where the plurality of component carriers includes uplink and downlink component carriers and where each uplink component carrier is associated with at least one downlink component carrier. The processor executable code, when executed by the processor, also configures the user equipment to receive a random access request on a first uplink component carrier of the plurality of component carriers, where the first uplink component carrier is identified by the user equipment. The processor executable code, when executed by the processor, additionally configures the user equipment to transmit a response on a first downlink component carrier of the plurality of component carriers, where the first downlink component carrier is linked to the first uplink component carrier.

Another aspect relates to a wireless communication device that includes means for selecting an uplink component carrier for transmitting a random access request by a user equipment, where the user equipment is configured to operate with a plurality of component carriers comprising uplink and downlink component carriers. The wireless communication device also includes means for transmitting the random access request on the selected uplink component carrier, and means for receiving a response to the random access request on a first downlink component carrier in the plurality of component carriers, where the first downlink component carrier is linked with the selected uplink component carrier.

Another aspect relates to a wireless communication device that includes means for configuring a plurality of component carriers for use by a user equipment in a wireless communication network, where the plurality of component carriers comprise uplink and downlink component carriers and where each uplink component carrier is associated with at least one downlink component carrier. The wireless communication device also includes means for receiving a random access request from the user equipment on a first uplink component carrier of the plurality of component carriers, where the first uplink component carrier is identified by the user equipment. The wireless communication device further includes means for transmitting a response on a first downlink component carrier of the plurality of component carriers, where the first downlink component carrier is linked to the first uplink component carrier.

Another aspect relates to a computer program product, embodied on a non-transitory computer-readable medium that includes program code for selecting an uplink component carrier for transmitting a random access request by a user equipment in a wireless communication network, where the user equipment is configured to operate with a plurality of component carriers comprising uplink and downlink component carriers. The computer program product further includes program code for transmitting the random access request on the selected uplink component carrier, and program code for receiving a response to the random access request on a first downlink component carrier in the plurality of component carriers, where the first downlink component carrier is linked with the selected uplink component carrier.

Another aspect relates to a computer program product, embodied on a non-transitory computer-readable medium that includes program code for configuring a plurality of component carriers for use by a user equipment in a wireless communication network, where the plurality of component carriers includes uplink and downlink component carriers and where each uplink component carrier is associated with at least one downlink component carrier. The computer program product further includes program code for receiving a random access request from the user equipment on a first uplink component carrier of the plurality of component carriers, where the first uplink component carrier is identified by the user equipment. The computer program product additionally includes program code for transmitting a response on a first downlink component carrier of the plurality of component carriers, wherein the first downlink component carrier is linked to the first uplink component carrier.

These and other features of various embodiments, together with the organization and manner of operation thereof, will become apparent from the following detailed description when taken in conjunction with the accompanying drawings, in which like reference numerals are used to refer to like parts throughout.

BRIEF DESCRIPTION OF THE DRAWINGS

Various disclosed embodiments are illustrated by way of example, and not of limitation, by referring to the accompanying drawings, in which.

DETAILED DESCRIPTION

Figure 1:
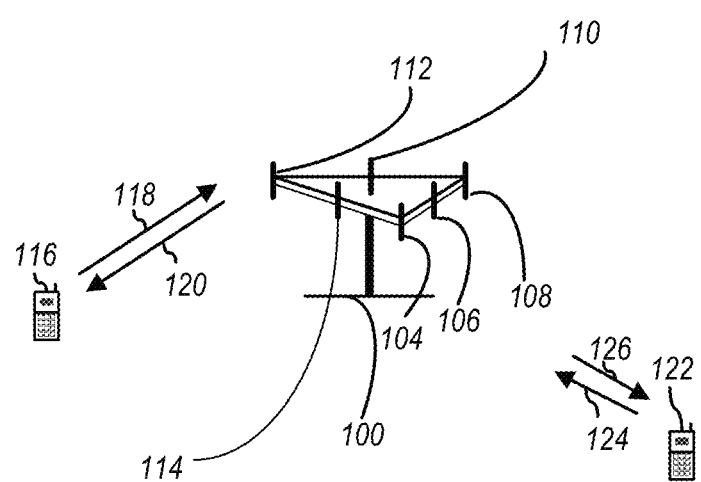
FIG. 1 illustrates a wireless communication system.

In the following description, for purposes of explanation and not limitation, details and descriptions are set forth in order to provide a using understanding of the various disclosed embodiments. However, it will be apparent to those skilled in the art that the various embodiments may be practiced in other embodiments that depart from these details and descriptions.

As used herein, the terms "component," "module," "system" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, certain embodiments are described herein in connection with a user equipment. A user equipment can also be called a user terminal, and may contain some or all of the functionality of a system, subscriber unit, subscriber station, mobile station, mobile wireless terminal, mobile device, node, device, remote station, remote terminal, terminal, wireless communication device, wireless communication apparatus or user agent. A user equipment can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with one or more wireless terminals and can also be called, and may contain some or all of the functionality of, an access point, node, wireless node, Node B, evolved NodeB (eNode B or eNB) or some other network entity. A base station communicates over the air-interface with wireless terminals. The communication may take place through one or more sectors. The base station can act as a router between the wireless terminal and the rest of the access network, which can include an Internet Protocol (IP) network, by converting received air-interface frames to IP packets. The base station can also coordinate management of attributes for the air interface, and may also be the gateway between a wired network and the wireless network.

Various aspects, embodiments or features will be presented in terms of systems that may include a number of devices, components, modules, and the like. It is to be understood and appreciated that the various systems may include additional devices, components, modules, and so on, and/or may not include all of the devices, components, modules and so on, discussed in connection with the figures. A combination of these approaches may also be used.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner.

The various disclosed embodiments may be incorporated into a communication system. In one example, such communication system utilizes an orthogonal frequency division multiplex (OFDM) that effectively partitions the overall system bandwidth into multiple ($N_F$) subcarriers, which may also be referred to as frequency sub-channels, tones or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval, which may be dependent on the bandwidth of each frequency subcarrier, a modulation symbol may be transmitted on each of the $N_F$ frequency subcarriers. Thus, OFDM may be used to combat inter-symbol interference (ISI) caused by frequency selective fading, which is characterized by different amounts of attenuation across the system bandwidth.

As noted earlier, communications in the uplink and downlink between the base station and user equipment can be established through a single-in-single-out (SISO), multiple-in-single-out (MISO), single-in-multiple-out (SIMO) or a multiple-in-multiple-out (MIMO) system. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels (or layers), where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station.

FIG. 1 illustrates a wireless communication system within which the various aspects disclosed herein can be embodied. As shown, base station 100 may include multiple antenna groups, and each antenna group may comprise one or more antennas. For example, if the base station 100 comprises six antennas, one antenna group may comprise a first antenna 104 and a second antenna 106, another antenna group may comprise a third antenna 108 and a fourth antenna 110, while a third group may comprise a fifth antenna 112 and a sixth antenna 114. It should be noted that while each of the above-noted antenna groups were identified as having two antennas, more or fewer antennas may be utilized in each antenna group and may be disposed at various orientations with respect to each antenna and each antenna group.

A first user equipment 116 is illustrated to be in communication with, for example, the fifth antenna 112 and the sixth antenna 114 to enable the transmission of information to the first user equipment 116 over a first forward link 120, and the reception of information from the first user equipment 116 over a first reverse link 118. FIG. 1 also illustrates a second user equipment 122 that is in communication with, for example, the third antenna 108 and the fourth antenna 110 to enable the transmission of information to the second user equipment 122 over a second forward link 126, and the reception of information from the second user equipment 122 over a second reverse link 124. In a Frequency Division Duplex (FDD) system, the communication links 118, 120, 124 126 that are shown in FIG. 1 may use different frequencies for communication. For example, the first forward link 120 may use a different frequency than that used by the first reverse link 118.

In some embodiments, each group of antennas and/or the area in which they are designed to communicate is often referred to as a sector of the base station. For example, the different antenna groups that are depicted in FIG. 1 may be designed to communicate to the user equipment in a sector of the base station 100. In communication over the forward links 120 and 126, the transmitting antennas of the base station 100 utilize beam forming in order to improve the signal-to-noise ratio of the forward links for the different user equipment 116 and 122. Also, a base station that uses beam forming to transmit to user equipment scattered randomly throughout its coverage area causes less interference to user equipment in the neighboring cells than a base station that transmits omni-directionally through a single antenna to all its user equipment.

The communication networks that may accommodate some of the various disclosed embodiments may include logical channels that are classified into Control Channels and Traffic Channels. Logical control channels may include a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing radio resource control (RRC) connection, MCCH is only used by the user equipments that receive MBMS. Dedicated control channel (DCCH) is another logical control channel that is a point-to-point bi-directional channel transmitting dedicated control information, such as user-specific control information used by the user equipment having an RRC connection. Common control channel (CCCH) is also a logical control channel that may be used for random access information. Logical traffic channels may comprise a dedicated traffic channel (DTCH), which is a point-to-point bi-directional channel dedicated to one user equipment for the transfer of user information. Also, a multicast traffic channel (MTCH) may be used for point-to-multipoint downlink transmission of traffic data.

The communication networks that accommodate some of the various embodiments may additionally include logical transport channels that are classified into downlink (DL) and uplink (UL). The DL transport channels may include a broadcast channel (BCH), a downlink shared data channel (DL-SDCH), a multicast channel (MCH) and a Paging Channel (PCH). The UL transport channels may include a random access channel (RACH), a request channel (REQCH), an uplink shared data channel (UL-SDCH) and a plurality of physical channels. The physical channels may also include a set of downlink and uplink channels.

In some disclosed embodiments, the downlink physical channels may include at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). The uplink physical channels may include at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

Further, the following terminology and features may be used in describing the various disclosed embodiments:

| | |
|---|---|
| 3G | 3rd Generation |
| 3GPP | 3rd Generation Partnership Project |
| ACLR | Adjacent channel leakage ratio |
| ACPR | Adjacent channel power ratio |
| ACS | Adjacent channel selectivity |
| ADS | Advanced Design System |
| AMC | Adaptive modulation and coding |
| A-MPR | Additional maximum power reduction |
| ARQ | Automatic repeat request |
| BCCH | Broadcast control channel |
| BTS | Base transceiver station |
| CDD | Cyclic delay diversity |
| CCDF | Complementary cumulative distribution function |
| CDMA | Code division multiple access |
| CFI | Control format indicator |
| Co-MIMO | Cooperative MIMO |
| CP | Cyclic prefix |
| CPICH | Common pilot channel |
| CPRI | Common public radio interface |
| CQI | Channel quality indicator |
| CRC | Cyclic redundancy check |
| DCI | Downlink control indicator |
| DFT | Discrete Fourier transform |
| DFT-SOFDM | Discrete Fourier transform spread OFDM |
| DL | Downlink (base station to subscriber transmission) |
| DL-SCH | Downlink shared channel |
| DSP | Digital signal processing |
| DT | Development toolset |
| DVSA | Digital vector signal analysis |
| EDA | Electronic design automation |

| | |
|---|---|
| E-DCH | Enhanced dedicated channel |
| E-UTRAN | Evolved UMTS terrestrial radio access network |
| eMBMS | Evolved multimedia broadcast multicast service |
| eNB | Evolved Node B |
| EPC | Evolved packet core |
| EPRE | Energy per resource element |
| ETSI | European Telecommunications Standards Institute |
| E-UTRA | Evolved UTRA |
| E-UTRAN | Evolved UTRAN |
| EVM | Error vector magnitude |
| FDD | Frequency division duplex |
| FFT | Fast Fourier transform |
| FRC | Fixed reference channel |
| FS1 | Frame structure type 1 |
| FS2 | Frame structure type 2 |
| GSM | Global system for mobile communication |
| HARQ | Hybrid automatic repeat request |
| HDL | Hardware description language |
| HI | HARQ indicator |
| HSDPA | High speed downlink packet access |
| HSPA | High speed packet access |
| HSUPA | High speed uplink packet access |
| IFFT | Inverse FFT |
| IOT | Interoperability test |
| IP | Internet protocol |
| LO | Local oscillator |
| LTE | Long term evolution |
| MAC | Medium access control |
| MBMS | Multimedia broadcast multicast service |
| MBSFN | Multicast/broadcast over single-frequency network |
| MCH | Multicast channel |
| MIMO | Multiple input multiple output |
| MISO | Multiple input single output |
| MME | Mobility management entity |
| MOP | Maximum output power |
| MPR | Maximum power reduction |
| MU-MIMO | Multiple user MIMO |
| NAS | Non-access stratum |
| OBSAI | Open base station architecture interface |
| OFDM | Orthogonal frequency division multiplexing |
| OFDMA | Orthogonal frequency division multiple access |
| PAPR | Peak-to-average power ratio |
| PAR | Peak-to-average ratio |
| PBCH | Physical broadcast channel |
| P-CCPCH | Primary common control physical channel |
| PCFICH | Physical control format indicator channel |
| PCH | Paging channel |
| PDCCH | Physical downlink control channel |
| PDCP | Packet data convergence protocol |
| PDSCH | Physical downlink shared channel |
| PHICH | Physical hybrid ARQ indicator channel |
| PHY | Physical layer |
| PRACH | Physical random access channel |
| PMCH | Physical multicast channel |
| PMI | Pre-coding matrix indicator |
| P-SCH | Primary synchronization signal |
| PUCCH | Physical uplink control channel |
| PUSCH | Physical uplink shared channel |
| RACH | Random access channel |
| TDD | Time division duplex. |

Figure 2:
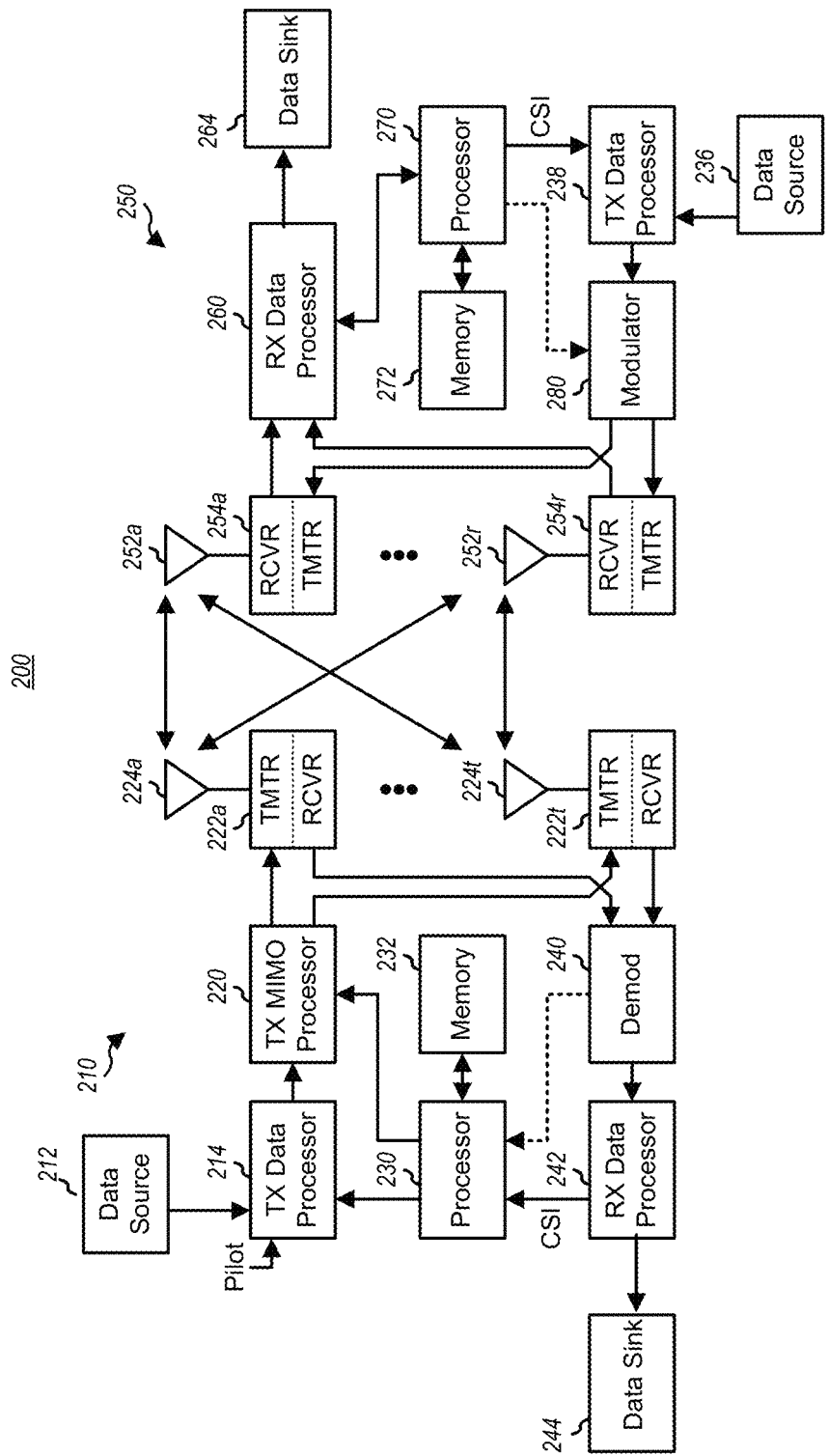
FIG. 2 illustrates a block diagram of a communication system.

FIG. 2 illustrates a block diagram of an exemplary communication system that may accommodate various embodiments according to the present disclosure. Communication system 200 can be a MIMO system that is exemplarily depicted in FIG. 2 and comprises a transmitter system 210 (e.g., a base station or access point) and a receiver system 250 (e.g., an access terminal or user equipment). It will be appreciated by one of ordinary skill that even though the base station is referred to as a transmitter system 210 and a user equipment is referred to as a receiver system 250, as illustrated, embodiments of these systems are capable of bi-directional communications. In that regard, the terms "transmitter system 210" and "receiver system 250" should not be used to imply single directional communications from either system. It should also be noted the transmitter system 210 and the receiver system 250 of FIG. 2 are each capable of communicating with a plurality of other receiver and transmitter systems that are not explicitly depicted in FIG. 2. At the transmitter system 210, traffic data for a number of data streams is provided from a data source 212 to a transmit (TX) data processor 214. Each data stream may be transmitted over a respective transmitter system. The TX data processor 214 formats, codes and interleaves the traffic data for each data stream, based on a particular coding scheme selected for that data stream, to provide the coded data.

The coded data for each data stream may be multiplexed with pilot data using, for example, OFDM techniques. The pilot data is typically a known data pattern that is processed in a known manner and may be used at the receiver system to estimate the channel response. The multiplexed pilot and coded data for each data stream is then modulated (symbol mapped) based on a particular modulation scheme (e.g., BPSK, QSPK, M-PSK or M-QAM) selected for that data stream to provide modulation symbols. The data rate, coding and modulation for each data stream may be determined by instructions performed by a processor 230 of the transmitter system 210.

In the exemplary block diagram of FIG. 2, the modulation symbols for all data streams may be provided to a TX MIMO processor 220, which can further process the modulation symbols (e.g., for OFDM). The TX MIMO processor 220 then provides $N_T$ modulation symbol streams to $N_T$ transmitter system transceivers (TMTR) 222a through 222t. In one embodiment, the TX MIMO processor 220 may further apply beamforming weights to the symbols of the data streams and to the antenna from which the symbol is being transmitted.

Each transmitter system transceiver 222a through 222t receives and processes a respective symbol stream to provide one or more analog signals, and further condition the analog signals to provide a modulated signal suitable for transmission over the MIMO channel. In some embodiments, the conditioning may include, but is not limited to, operations such as amplification, filtering, up-conversion and the like. The modulated signals produced by the transmitter system transceivers 222a through 222t are then transmitted from the transmitter system antennas 224a through 224t that are shown in FIG. 2.

At the receiver system 250, the transmitted modulated signals may be received by the receiver system antennas 252a through 252r, and the received signal from each of the receiver system antennas 252a through 252r is provided to a respective receiver system transceiver (RCVR) 254a through 254r. Each receiver system transceiver 254a through 254r conditions a respective received signal, digitizes the conditioned signal to provide samples and may further processes the samples to provide a corresponding "received" symbol stream. In some embodiments, the conditioning may include, but is not limited to, operations such as amplification, filtering, down-conversion and the like.

An RX data processor 260 then receives and processes the symbol streams from the receiver system transceivers 254a through 254r based on a particular receiver processing technique to provide a plurality of "detected" symbol streams. In one example, each detected symbol stream can include symbols that are estimates of the symbols transmitted for the corresponding data stream. The RX data processor 260 then, at least in part, demodulates, de-interleaves and decodes each detected symbol stream to recover the traffic data for the corresponding data stream. The processing by the RX data processor 260 may be complementary to that performed by the TX MIMO processor 220 and the TX data processor 214 at the transmitter system 210. The RX data processor 260 can additionally provide processed symbol streams to a data sink 264.

In some embodiments, a channel response estimate is generated by the RX data processor 260 and can be used to perform space/time processing at the receiver system 250, adjust power levels, change modulation rates or schemes, and/or other appropriate actions. Additionally, the RX data processor 260 can further estimate channel characteristics such as signal-to-noise (SNR) and signal-to-interference ratio (SIR) of the detected symbol streams. The RX data processor 260 can then provide estimated channel characteristics to a processor 270. In one example, the RX data processor 260 and/or the processor 270 of the receiver system 250 can further derive an estimate of the "operating" SNR for the system. The processor 270 of the receiver system 250 can also provide channel state information (CSI) (also referred to a channel status information in some embodiments), which may include information regarding the communication link and/or the received data stream. This information, which may contain, for example, the operating SNR and other channel information, may be used by the transmitter system 210 (e.g., base station or eNodeB) to make proper decisions regarding, for example, the user equipment scheduling, MIMO settings, modulation and coding choices and the like. At the receiver system 250, the CSI that is produced by the processor 270 is processed by a TX data processor 238, modulated by a modulator 280, conditioned by the receiver system transceivers 254a through 254r and transmitted back to the transmitter system 210. In addition, a data source 236 at the receiver system 250 can provide additional data to be processed by the TX data processor 238.

In some embodiments, the processor 270 at the receiver system 250 may also periodically determine which pre-coding matrix to use. The processor 270 formulates a reverse link message comprising a matrix index portion and a rank value portion. The reverse link message may comprise various types of information regarding the communication link and/or the received data stream. The reverse link message is then processed by the TX data processor 238 at the receiver system 250, which may also receive traffic data for a number of data streams from the data source 236. The processed information is then modulated by a modulator 280, conditioned by one or more of the receiver system transceivers 254a through 254r, and transmitted back to the transmitter system 210.

In some embodiments of the MIMO communication system 200, the receiver system 250 is capable of receiving and processing spatially multiplexed signals. In these systems, spatial multiplexing occurs at the transmitter system 210 by multiplexing and transmitting different data streams on the transmitter system antennas 224a through 224t. This is in contrast to the use of transmit diversity schemes, where the same data stream is sent from multiple transmitter systems antennas 224a through 224t. In a MIMO communication system 200 capable of receiving and processing spatially multiplexed signals, a precode matrix is typically used at the transmitter system 210 to ensure the signals transmitted from each of the transmitter system antennas 224a through 224t are sufficiently decorrelated from each other. This decorrelation ensures that the composite signal arriving at any particular receiver system antenna 252a through 252r can be received and the individual data streams can be determined in the presence of signals carrying other data streams from other transmitter system antennas 224a through 224t.

Since the amount of cross-correlation between streams can be influenced by the environment, it is advantageous for the receiver system 250 to feed back information to the transmitter system 210 about the received signals. In these systems, both the transmitter system 210 and the receiver system 250 contain a codebook with a number of precoding matrices. Each of these precoding matrices can, in some instances, be related to an amount of cross-correlation experienced in the received signal. Since it is advantageous to send the index of a particular matrix rather than the values in the matrix, the feedback control signal sent from the receiver system 250 to the transmitter system 210 typically contains the index of a particular precoding matrix (i.e., the precoding matrix indicator (PMI)). In some instances the feedback control signal also includes a rank indicator (RI), which indicates to the transmitter system 210 how many independent data streams to use in spatial multiplexing.

Other embodiments of MIMO communication system 200 are configured to utilize transmit diversity schemes instead of the spatially multiplexed scheme described above. In these embodiments, the same data stream is transmitted across the transmitter system antennas 224a through 224t. In these embodiments, the data rate delivered to receiver system 250 is typically lower than spatially multiplexed MIMO communication systems 200. These embodiments provide robustness and reliability of the communication channel. In transmit diversity systems, each of the signals transmitted from the transmitter system antennas 224a through 224t will experience a different interference environment (e.g., fading, reflection, multi-path phase shifts). In these embodiments, the different signal characteristics received at the receiver system antennas 252a through 254r are useful in determining the appropriate data stream. In these embodiments, the rank indicator is typically set to 1, telling the transmitter system 210 not to use spatial multiplexing.

Other embodiments may utilize a combination of spatial multiplexing and transmit diversity. For example in a MIMO communication system 200 utilizing four transmitter system antennas 224a through 224t, a first data stream may be transmitted on two of the transmitter system antennas 224a through 224t and a second data stream transmitted on remaining two transmitter system antennas 224a through 224t. In these embodiments, the rank index is set to an integer lower than the full rank of the precode matrix, indicating to the transmitter system 210 to employ a combination of spatial multiplexing and transmit diversity.

At the transmitter system 210, the modulated signals from the receiver system 250 are received by the transmitter system antennas 224a through 224t, are conditioned by the transmitter system transceivers 222a through 222t, are demodulated by a transmitter system demodulator 240, and are processed by the RX data processor 242 to extract the reserve link message transmitted by the receiver system 250. In some embodiments, the processor 230 of the transmitter system 210 then determines which pre-coding matrix to use for future forward link transmissions, and then processes the extracted message. In other embodiments, the processor 230 uses the received signal to adjust the beamforming weights for future forward link transmissions.

In other embodiments, a reported CSI can be provided to the processor 230 of the transmitter system 210 and used to determine, for example, data rates as well as coding and modulation schemes to be used for one or more data streams. The determined coding and modulation schemes can then be provided to one or more transmitter system transceivers 222a through 222t at the transmitter system 210 for quantization and/or use in later transmissions to the receiver system 250. Additionally and/or alternatively, the reported CSI can be used by the processor 230 of the transmitter system 210 to generate various controls for the TX data processor 214 and the TX MIMO processor 220. In one example, the CSI and/or other information processed by the RX data processor 242 of the transmitter system 210 can be provided to a data sink 244.

In some embodiments, the processor 230 at the transmitter system 210 and the processor 270 at the receiver system 250 may direct operations at their respective systems. Additionally, a memory 232 at the transmitter system 210 and a memory 272 at the receiver system 250 can provide storage for program codes and data used by the transmitter system processor 230 and the receiver system processor 270, respectively. Further, at the receiver system 250, various processing techniques can be used to process the $N_R$ received signals to detect the $N_T$ transmitted symbol streams. These receiver processing techniques can include spatial and space-time receiver processing techniques, which can include equalization techniques, "successive nulling/equalization and interference cancellation" receiver processing techniques, and/or "successive interference cancellation" or "successive cancellation" receiver processing techniques.

The disclosed embodiments may be used in conjunction with systems that operate in frequency division duplex (FDD) or time division duplex (TDD) modes. In FDD systems, different carrier frequencies are configured for uplink and downlink transmissions. In time division duplex (TDD) systems, uplink and downlink transmissions are carried out on the same carrier frequency such that uplink and downlink transmissions within a frame are separated in time. Further, uplink and downlink resources within a TDD frame are not necessarily symmetrically allocated.

Figure 3:
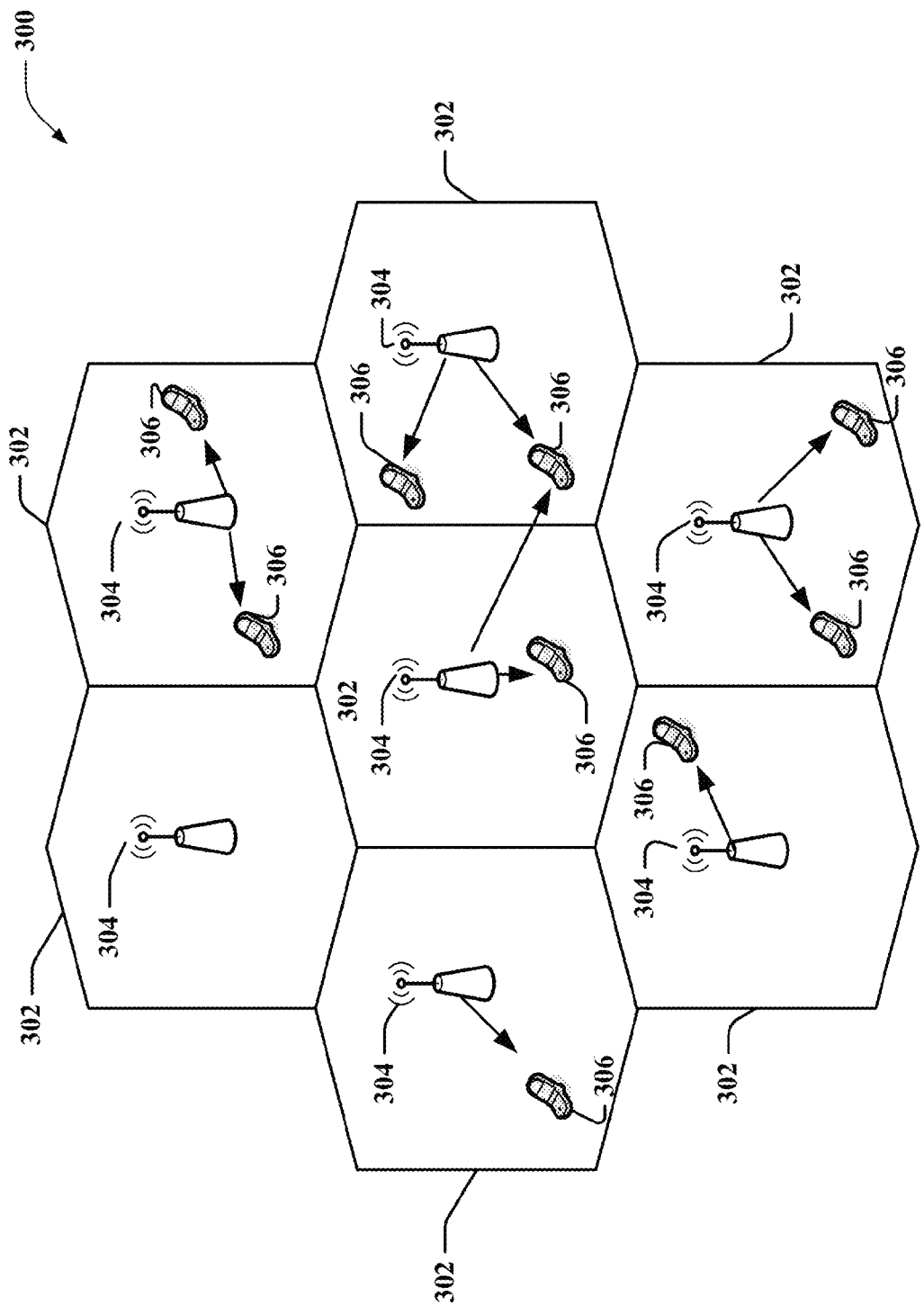
FIG. 3 illustrates an exemplary wireless network.

FIG. 3 illustrates an exemplary access network in an LTE network architecture that can be used in conjunction with the present disclosure. In this example, the access network 300 is divided into a number of cellular regions (cells) 302. An eNodeB 304 is assigned to a cell 302 and is configured to provide an access point to a core network for all the user equipment (UEs) 306 in the cell 302. Each user equipment 306 may communicate with one or more eNodeBs 304 on a forward link and/or a reverse link at a particular time, depending upon whether the user equipment 306 is active and whether it is in soft handoff, for example. The access network 300 may provide service over a large geographical region, where, for example, the depicted cells 302 may cover a few blocks in a neighborhood.

There is no centralized controller in the example access network 300 of FIG. 3, but a centralized controller may be used in alternative configurations and embodiments. In other configurations, one eNodeB 304 may control the operations of a plurality of cells 302. The eNodeB 304 can be responsible for all radio related functions including radio bearer control, admission control, mobility control, scheduling, security, and connectivity to the serving gateway in a core network. The network of FIG. 3 can also be utilized to enable coordinated multipoint (CoMP) transmission and/or reception. In such exemplary systems, coordinated transmissions from multiple antennas at different cells 302 can be used to improve system performance. Coordinated transmissions and/or receptions are particularly beneficial for the user equipment 306 that are located far from the antenna cites within a cell 302. For instance, by transmitting the same signal from multiple antennas at different sites, the signal to noise ratio of the received signal at the user equipment 306 can be improved.

In describing the various entities of FIG. 3, as well as other associated figures associated, for the purposes of explanation, the nomenclature associated with a 3GPP LTE or LTE-A wireless network is used. However, it is to be appreciated that the system 400 may be adapted to operate in other networks such as, but not limited to, an OFDMA wireless network, a CDMA network, a 3GPP2 CDMA2000 network, and the like.

Figure 4:
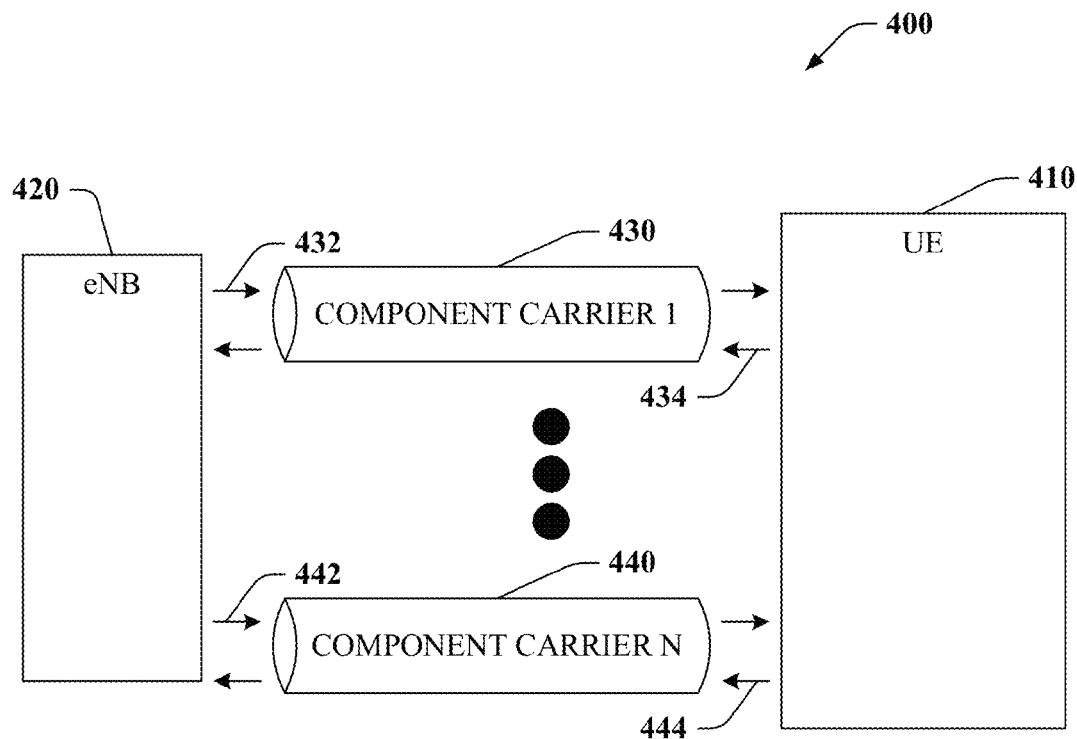
FIG. 4 illustrates a wireless system that utilizes multiple component carriers for communication.

In LTE-A based systems, a user equipment can be configured with multiple component carriers utilized by an eNodeB to enable a wider overall transmission bandwidth. Such a configuration may be effected through layer 3 (i.e., radio resource control (RRC)) operations. Moreover, to enable communication between the eNodeB and the user equipment, some or all of the configured component carriers must be activated. The activation may be carried out by layer 2 signaling. FIG. 4 illustrates an exemplary multiple-component carrier system, in which the user equipment 410 can be configured with "component carrier 1" 430 through "component carrier N" 440, where N is an integer greater than or equal to one. FIG. 4 depicts two or more component carriers. It is to be appreciated that the user equipment 410 can be configured with any suitable number of component carriers and, accordingly, the subject matter disclosed herein and claimed is not limited to two or an particular number of component carriers. In one example, some of the multiple component carriers 430 through 440 can be LTE Rel-8 carriers. Thus, some of the component carriers 430 through 440 can appear as an LTE carrier to a legacy (e.g., an LTE Rel-8 based) user equipment.

Each component carrier 430 through 440 of FIG. 4 can include respective downlinks 432 and 442 as well as respective uplinks 434 and 444. In the sections that follow, each of the forward links 432 through 442 may be referred to as a downlink component carrier, whereas each of the reverse links 434 through 444 may be referred to an uplink component carrier. It should be noted that the exemplary diagram of FIG. 4 illustrates an equal number of uplink and downlink component carriers. However, in some systems, the number of uplink component carriers may differ from the number of downlink component carriers. Additionally, or alternatively, the bandwidth of the aggregated uplink component carriers may be different from the bandwidth of the aggregated downlink component carriers.

In some multi-component carrier systems, a user equipment may be configured with only one primary component carrier (PCC) and one or more secondary component carriers (SCCs). In some scenarios an uplink component carrier is associated with a downlink component carrier to enable proper communications between a user equipment and an eNodeB. Such an association, or linking, can be signaled to the user equipment as part of system information blocks (SIBs). In one example, SIB2 is used to convey uplink and downlink association to the user equipment.

Proper communication between a user equipment and an eNodeB may require the acquisition and maintenance of uplink synchronization. Such a synchronization can avoid interference between multiple user equipment with uplink data that are scheduled to be transmitted during the same information unit (e.g., a subframe of the communication system). When a user equipment is in RRC_CONNECTED state, the eNodeB can provide a timing advance value as part of timing control information to allow the user equipment to adjust the timing of its uplink transmissions.

Figure 5:
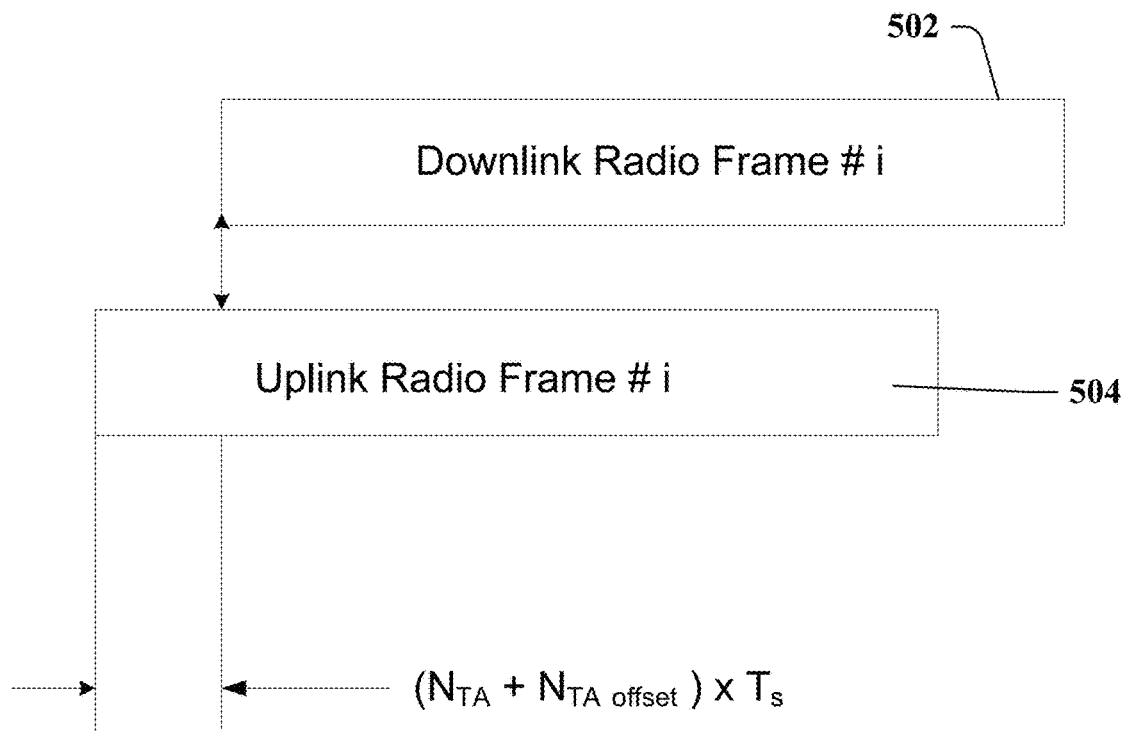
FIG. 5 illustrates an exemplary uplink radio frame timing synchronization in a wireless communication system.

Timing advance value in the context of uplink synchronization according to one embodiment is described with reference to FIG. 5. An exemplary timing advance (TA) command that is provided by the eNodeB to the user equipment, includes information as to how the timing of the uplink transmission radio frames should be adjusted relative to the current timing of the downlink radio frames associated with that user equipment. FIG. 5 illustrates exemplary timing relationships between the uplink and downlink radio frames for a given user equipment of a communication system. As illustrated in the exemplary diagram of FIG. 5, the transmission of the uplink radio frame i 504 starts $(N_{TA}+N_{TA\ offset}) \times T_s$ seconds before the transmission of the downlink radio frame i 502, where $T_s$ is the basic time unit and is equal to $1/(15,000\times2,048)$ seconds for LTE systems. $N_{TA\ offset}$ is zero for LTE frame structure type 1 and 624 for LTE frame structure type 2 (other than in a random access response, in which $N_{TA\ offset}$ is zero for both frame structure types). A timing advance command enables the user equipment to ascertain the timing advance value of $N_{TA}$ in order to effect the necessary timing adjustment for uplink synchronization.

The synchronization between the uplink and downlink transmissions may become skewed or lost due to system and tracking tolerance errors, (e.g., if no uplink transmission has taken place in a long time and/or when a new timing control information is issued while the user equipment is still in the process of effecting a previous timing control command). If the uplink is declared to be not synchronized, a random access procedure can be initiated to reacquire uplink synchronization. A random access procedure is also initiated, and uplink synchronization is acquired, when a user equipment is moving from RRC_IDLE state to RRC_CONNECTED state, when a new radio link is established after a radio link failure, when uplink synchronization is needed during a handover to a new cell and in other scenarios where uplink synchronization and/or assignment of a unique user equipment identity (e.g., a Cell Radio Network Temporary Identity (C-RNTI)) is needed. A random access procedure in LTE systems can be conducted in one of two forms: contention-based and contention-free.

Figure 6:
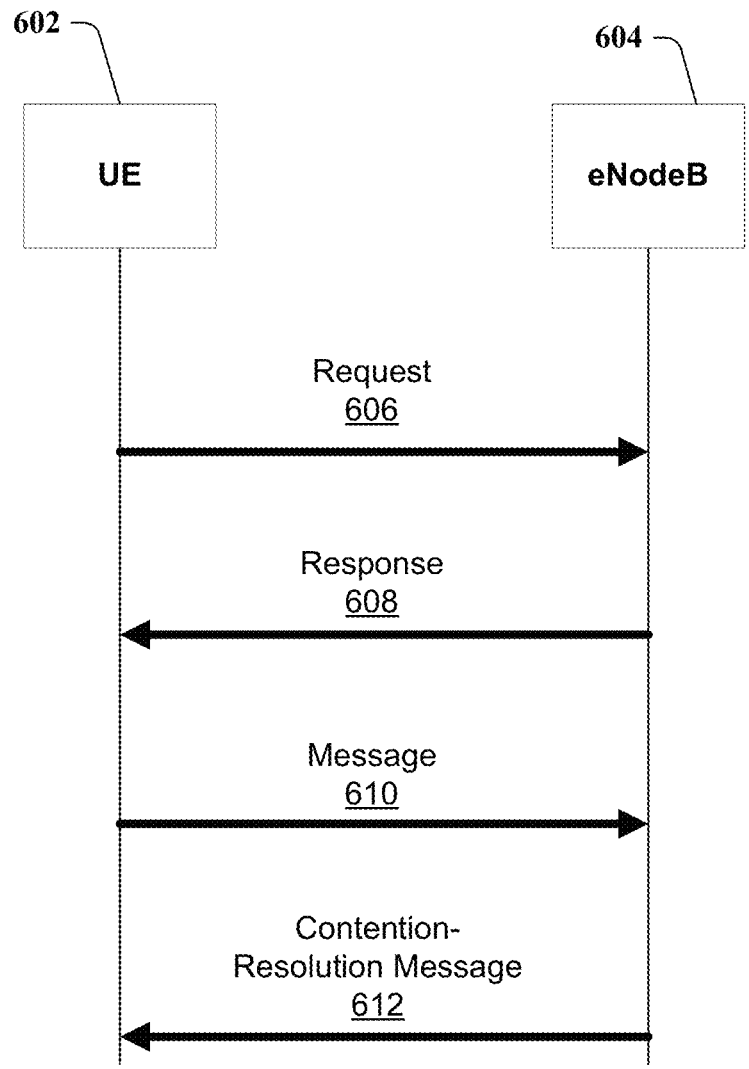
FIG. 6 illustrates communications between a user equipment and an eNodeB in a contention-based random access procedure.

In a contention-based random access procedure, which is illustrated in the exemplary diagram of FIG. 6, the user equipment 602 initiates the random access procedure by transmitting a random access request 606 to the eNodeB 604 on the physical random access channel (PRACH). The request 606 comprises a preamble that is selected from a particular group of preamble sequences associated with the cell. For example, a cell may be have a set of 64 preambles, a subset of which can be used by the user equipment 602 to initiate a contention-based random access procedure. The remaining preambles are reserved for a contention-free procedure. In response to receiving a random access request 606, the eNodeB 604 transmits a response 608 to the user equipment 602. Such a response includes information such as timing information, a C-RNTI or random access radio network temporary identifier (RA-RNTI), a scheduling grant for uplink transmission and the like. The response 608 is sent on the physical downlink shared channel (PDSCH).

In the next step of a contention-based procedure, the user equipment 602 responds to the eNodeB 604 by sending a message 610 that includes an RRC connection request, a scheduling request and other information. The message 610 may also include the user equipment 602 identity that is used by the eNodeB 604 as part of the contention-resolution mechanism. In a contention-based procedure, two or more user equipment 602 may initiate a random access procedure using the same preamble at the same time. Therefore, as the last step of a contention-based random access procedure, the eNodeB 604 transmits a contention-resolution message 612 to all such user equipment 602 to signal the selection of a particular user equipment for subsequent communications.

Figure 7:
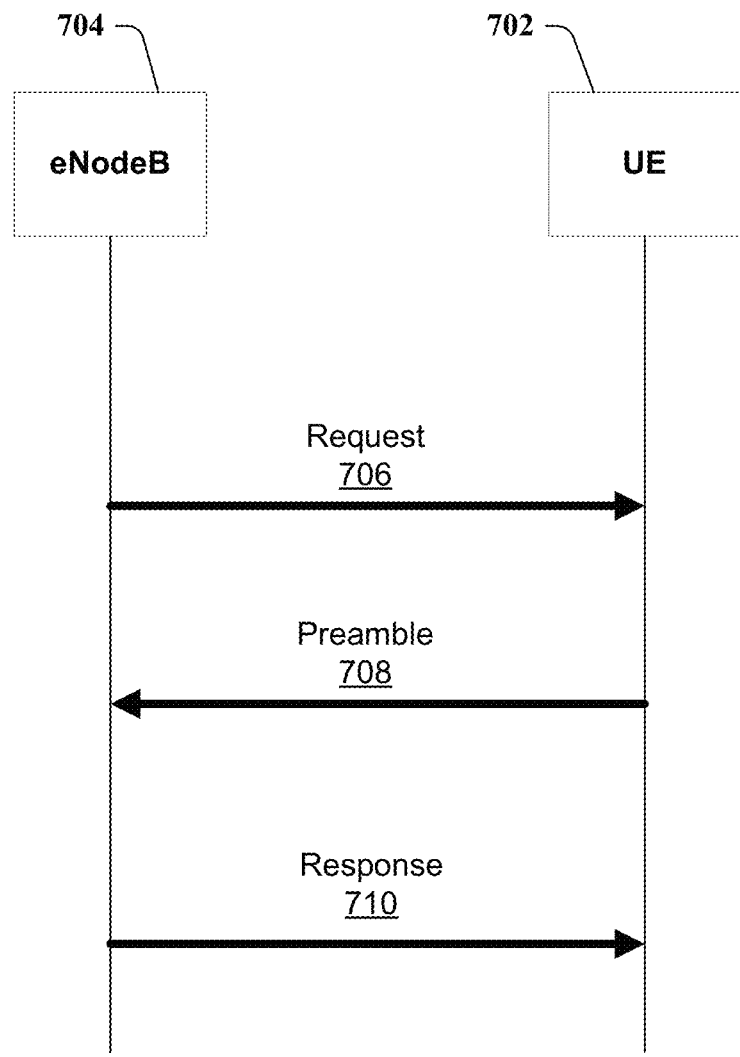
FIG. 7 illustrates communications between a user equipment and an eNodeB in a contention-free random access procedure.

In a contention-free random access procedure, which is illustrated in the exemplary diagram of FIG. 7, the eNodeB 704 initiates the process by transmitting a request 706 to the user equipment 702. Such a request 706 comprises a reserved preamble index that enables the user equipment 702 to carry out a contention-free random access procedure. The next steps of a contention-free random access procedure include the transmission of the reserved preamble 708 by the user equipment 702 to the eNodeB 704, which triggers the eNodeB 704 to transmit a response 710 that includes the necessary parameters and scheduling information for subsequent communications.

In order to participate in a contention-based random access procedure, a user equipment is configured with an uplink component carrier, which is used to communicate the random access preamble. The user equipment can also be configured with a downlink component carrier that is linked with that uplink component carrier. The linking can effected through, for example, a SIB2-cell specific linkage. In a baseline scenario, a random access procedure for radio resource control (RRC) establishment/re-establishment can be carried out based on RACH parameters and a single-component carrier pair using parameters obtained from system information block and/or dedicated signaling that targets one or more user equipment.

As noted earlier, in a multiple-component carrier system, a user equipment can be configured with one primary and one or more secondary component carriers. Such a configuration allows a random access procedure to be carried out using only the primary uplink/downlink component carrier pair. In such scenarios, the random access channel (RACH) associated with the primary component carriers is used for the transmission of the random access preamble in a contention-based random access procedure. The user equipment may also be allowed to carry out a random access procedure on a particular pair of uplink/downlink component carriers that may or may not include the primary component carriers. As such, the user equipment may be configured with random access channels that correspond to the secondary component carriers. In such configurations, when a random access procedure is necessitated by uplink data arrival and/or downlink data arrival with contention-based access, the user equipment may select a particular RACH from the set of configured RACHs. In one example, the selected RACH is associated with an activated downlink component carrier.

With multi-component carrier systems, the eNodeB can provide specific resources for a user equipment to carryout a contention-free random access procedure. To this end, the random access request is transmitted on a first downlink component carrier (e.g., the primary downlink component carrier). However, there is typically no indication in eNodeB's communications on PDCCH as to which uplink component carrier should be used for the random access procedure. In one example, the user equipment may select an uplink component carrier that is associated with the first downlink component carrier (i.e., the downlink component carrier that was used to initiate the request). In another example, the association or linkage between the first uplink and the selected downlink is ascertained from SIB2 information.

Alternatively, or additionally, such an association can be established through dedicated signaling that targets one or more user equipment. In one example, the selected uplink component carrier is the primary uplink component carrier. Since the primary uplink component carrier may be the only component carrier that is configured to carry uplink control information (e.g., acknowledgments (ACK), scheduling requests (SR) and channel quality indicator (CQI)), the selection of the primary uplink component carrier allows the transmission of uplink control information, as well as the random access information on the same (i.e., primary) component carrier, thereby facilitating downlink transmissions of new data.

The downlink component carrier may be associated with, or linked to, a secondary uplink component carrier. When a secondary uplink component carrier is used, uplink synchronization issues need further consideration. As noted earlier, proper uplink synchronization is maintained to ensure reliable communications between the user equipment and the eNodeB. When a user equipment is configured with multiple-component carriers, each uplink component carrier may require a different timing advance value for uplink synchronization. For example, the timing advance value associated with the primary uplink component carrier may differ from the timing advance value associated with a secondary uplink component carrier. In such a scenario, the transmission of uplink control information (e.g., ACK, SR, CQI, etc.) on the primary uplink component carrier requires a different timing advance value than the transmission of messages on the secondary uplink component carrier, which could lead to confusion at the eNodeB. According to the present disclosure, uplink synchronization issues across different component carriers can be mitigated by selecting a secondary uplink component carrier that has substantially the same timing advance value as the primary uplink component carrier. For instance, the difference between the timing advance value for the secondary uplink component carrier, obtained during the random access procedure, and the timing advance value for the primary uplink carrier may be within a particular synchronization tolerance that is specified in, for example, LTE specifications. Having substantially similar timing advance values among the selected and primary uplink component carriers allows uplink control information to be readily transmitted on the primary uplink carrier component carrier.

The selected secondary uplink component carrier can have a different timing advance value than the primary uplink component carrier. In such a scenario, due to a lack of uplink synchronization, the user equipment may be unable to reliably communicate the control information associated with the received downlink data. In one example, the user equipment performs consecutive contention-based random access procedures to acquire the needed synchronization.

As part of the request for a contention-free random access procedure, the PDCCH can additionally include an indication as to which uplink component carrier must be used by the user equipment. As such, the user equipment can readily use the "indicated" uplink component carrier for uplink communications based on the indication provided by the eNodeB. In this scenario, however, a particular downlink component carrier for transmitting the response (e.g., response 710 of FIG. 7) is selected by eNodeB. In one example, a downlink component carrier that is linked to the indicated uplink component carrier is selected. As noted earlier, such a linking may be effected through SIB2 signaling. In another example, the downlink component carrier that was used by the eNodeB for transmission of the initial request (i.e., request 706 of FIG. 7) is selected for the transmission of the response. In the latter example, the random access procedure is facilitated in situations where the indicated uplink component carrier is the primary uplink carrier but its linked download component carrier is unreliable.

Figure 8:
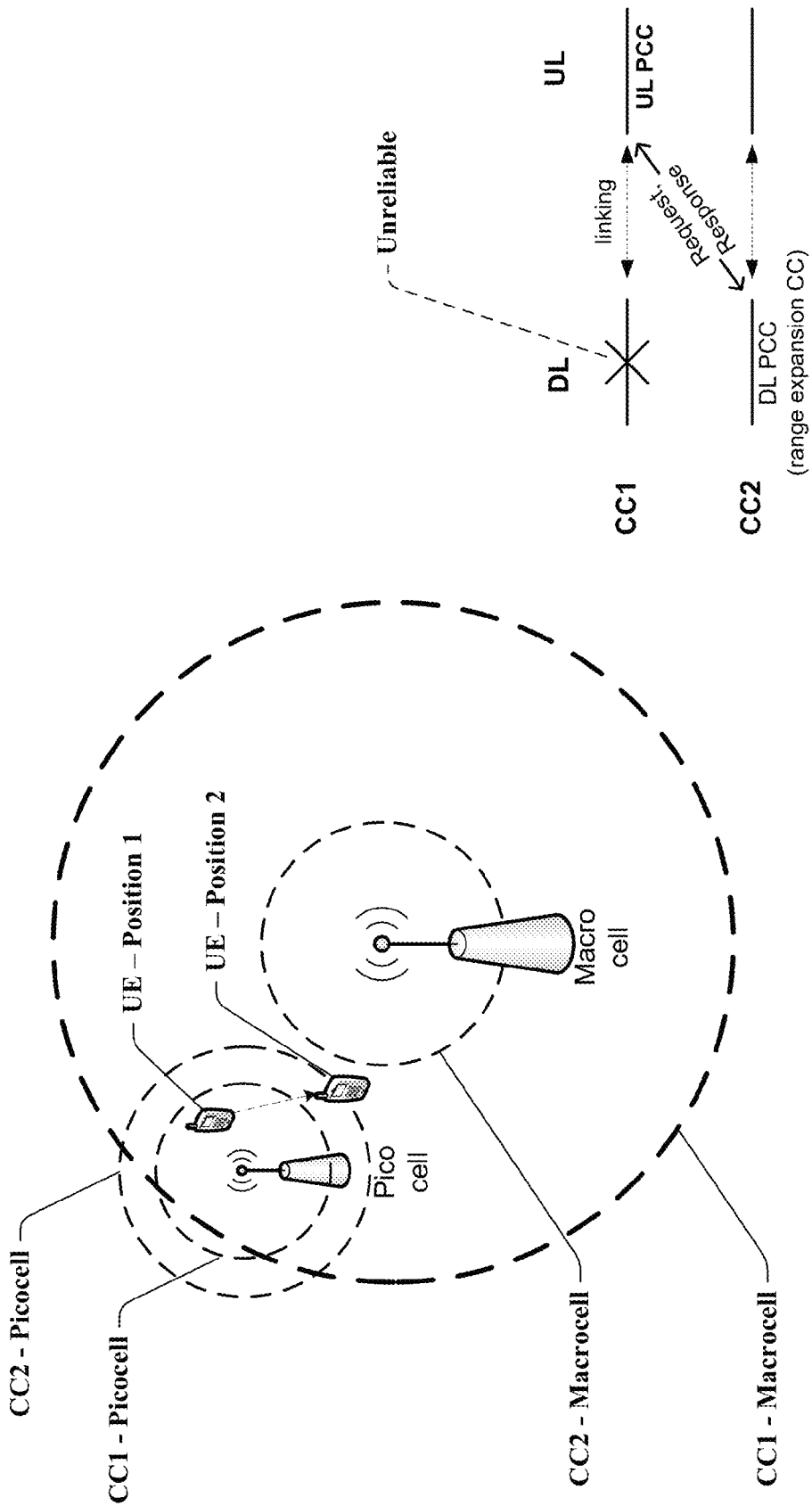
FIG. 8 illustrates an exemplary heterogeneous network (hetNet) that performs random access operations.

FIG. 8 illustrates an exemplary scenario in which the downlink component carrier used for the initial contention-free random access request becomes unreliable, thereby enabling the use of a different downlink component carrier for subsequent downlink transmissions. The exemplary diagram of FIG. 8 corresponds to a heterogeneous network (HetNet) which may include a low power picocell and a high power macrocell that are utilized to cooperatively improve system capacity and enhance network coverage.

In the example of FIG. 8, a contention-free random access procedure is started for a user equipment that is served by the picocell. The user equipment is initially in position 1, where the coverage of the first (e.g., primary) component carrier (CC1) associated with the picocell is small. When the user equipment moves into the range expansion region (i.e., position 2), the linked downlink component carrier (i.e., DL CC1), which is not the range expansion component carrier, can determined to be unreliable. Therefore, downlink transmissions to the user equipment may need to take place on the second downlink component carrier (i.e., DL CC2). In such a scenario, the first uplink component carrier (UL CC1) may still be reliable. Since the eNodeB may not know the quality of the downlink channels, it may first send a random access request on the downlink component carrier linked to the primary component carrier (i.e., on DL CC1 that is linked to UL CC1). If there is no response from the user equipment due to, for example, movement of the user equipment, the eNodeB can transmit the random access request on another downlink component carrier (e.g., on DL CC2) with an indication that the first uplink component carrier (i.e., UL CC1) must be used for uplink transmissions. The scenario that was discussed in connection with FIG. 8 provides an example of cross-carrier control for a random access procedure. The above scenario also illustrates that it is beneficial to select the most reliable component carrier for conducting a random access procedure (e.g., the range expansion component carrier in the exemplary configuration of FIG. 8).

Cross-carrier control in a contention-free random access procedure can be enabled by utilizing special signatures and/or RA-RNTIs to distinguish the correspondence of a random access response received by the user equipment on a downlink component carrier to a particular uplink component carrier. In particular, the eNodeB's response on a given downlink component carrier can correspond to either its linked uplink carrier, or another uplink carrier through cross-carrier control signaling. To resolve this ambiguity, in one embodiment, the random access response that is transmitted by the eNodeB is scrambled by specific signature sequences, where each specific signature sequence identifies a particular uplink component carrier. In another embodiment, special component carrier RA-RNTIs can be reserved to identify specific uplink component carriers. The random access response can then be scrambled by the component-carrier-specific RNTI to signal a particular uplink component carrier. The above noted mechanisms for component carrier specific scrambling can eliminate the need for transmission of additional bits (e.g., as part of downlink control information (DCI)) to signal cross-carrier control. In fact, such additional bits are not allowed in the current LTE specifications. A user equipment can, therefore, receive the scrambled response, descramble the response according to the special signature sequence number or the reserved RA-RNTI to ascertain the particular uplink component carrier.

Figure 9:
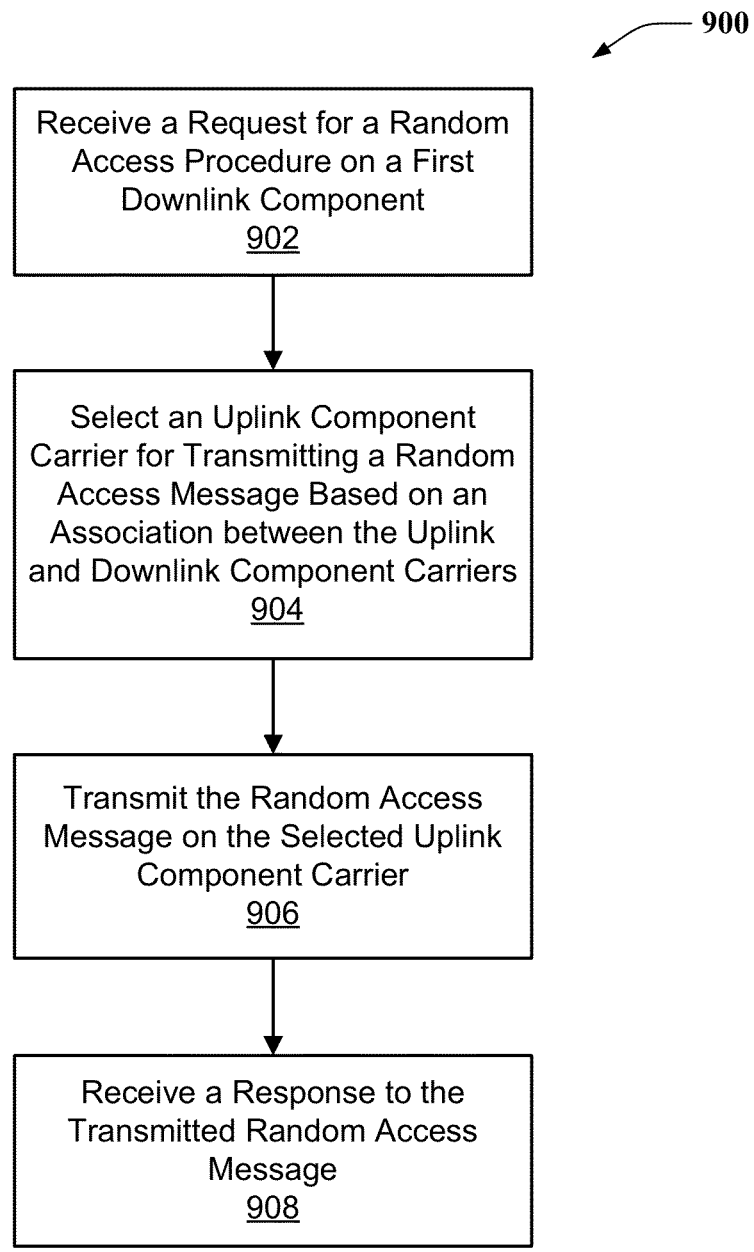
FIG. 9 illustrates a set of exemplary operations to enable a contention-free random access procedure by a user equipment.

FIG. 9 illustrates a set of exemplary operations 900 that can be carried out to enable a contention-free random access procedure. The operations 900 of FIG. 9 may be performed by, for example, a user equipment in a wireless communication network. As noted earlier, such a user equipment may be configured to operate with a number of uplink and/or downlink component carriers. At 902, a request for a contention-free random access procedure is received from an eNodeB. At 904, an uplink component carrier is selected for transmitting a random access message in response to the received request. The selection of the uplink component carrier at 904 is based on an association between the uplink and downlink component carriers. For example, such an association can be established through SIB2 signaling or it may be specified for the user equipment by higher layer signaling. Referring back to FIG. 9, at 906, the random access message is transmitted on the selected uplink component carrier and, at 908, a response to the transmitted random access message is received.

Figure 10:
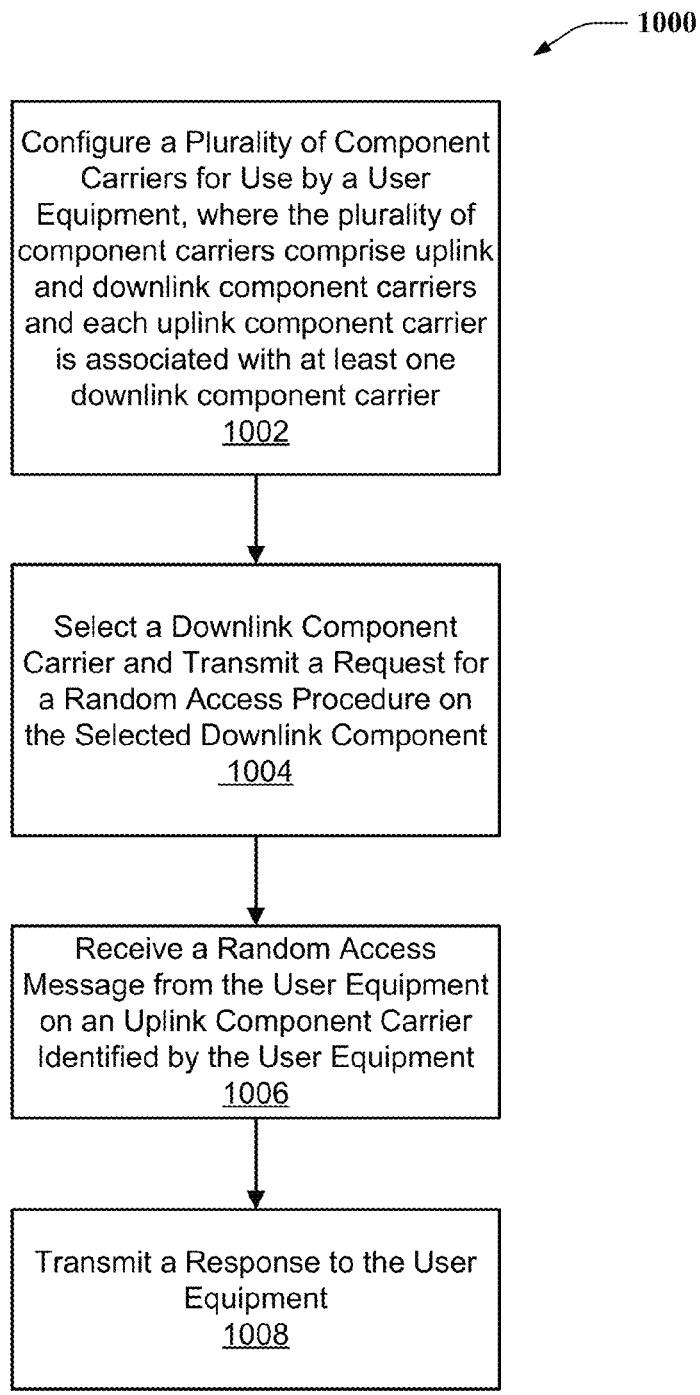
FIG. 10 illustrates a set of exemplary operations to enable a contention-free random access procedure by a wireless network entity.

FIG. 10 illustrates a set of exemplary operations 1000 that can be carried out to enable a contention-free random access procedure. The operations 1000 of FIG. 10 may be performed by, for example, an eNodeB in a wireless communication network. The eNodeB can be in communication with one or more user equipment in the wireless communication network. At 1002, a plurality of component carriers are configured for use by a user equipment. Such component carriers comprise uplink and downlink component carriers and each uplink component carrier is associated with at least one downlink component carrier. At 1004, a downlink component carrier is selected and a request for a random access procedure is transmitted to the user equipment on the selected downlink component carrier. At 1006, a random access message from the user equipment is received. Such a message is received on an uplink component carrier that is identified by the user equipment. At 1008, a response to the user equipment is transmitted.

The disclosed embodiments further facilitate contention-based random access procedures. As illustrated in the exemplary diagram of FIG. 6, a user equipment can initiate a contention-based random access procedure by transmitting a random access request to the eNodeB. Such a request may be sent upon, for example, uplink or downlink data arrival when the user equipment is not synchronized. To this end, the user equipment selects an uplink component carrier (hereinafter, "the selected uplink component carrier") for transmitting the request on a random access channel.

Next, the eNodeB transmits a response to the random access request. The response can be transmitted on a downlink component carrier that is linked to the selected uplink component carrier through SIB2 signaling. In order for the user equipment to receive the response from the eNodeB, the downlink component carrier associated with the selected uplink must be activated. Therefore, when selecting an uplink component carrier for transmitting the request, the user equipment may need to ascertain if the downlink component carrier associated with the selected uplink component carrier is among the active set of downlink component carriers.

As noted earlier, a user equipment may be configured with primary uplink/downlink component carriers and one or more secondary uplink/downlink component carriers. In such a multiple component carrier system, the user equipment may need to establish uplink synchronization for more than one component carrier. The user equipment can start by selecting the primary uplink component carrier for transmitting the contention-based random access procedure. Alternatively, the user equipment can select a secondary uplink component carrier that has substantially the same timing advance value as the primary uplink component carrier. As noted in connection with contention-free random access procedures, the selection of a secondary uplink component carrier with substantially the same timing advance value as the primary uplink component carrier ensures uplink synchronization of the primary uplink transmissions (e.g., control information transmissions) without incurring additional delays.

After selecting the primary uplink component carrier (or a secondary component carrier with substantially similar timing advance value), the user equipment may further perform a random access procedure for each remaining configured and activated uplink component carrier to obtain uplink synchronization when the timing advance values associated with the remaining uplink component carriers are different from the timing advance value of the selected uplink component carrier. Depending on the number of the remaining uplink component carriers, this operation can increase the processing load of the user equipment. Therefore, in some embodiments, a network entity, such as an eNodeB, specifies a particular set of uplink component carriers to be synchronized. The number and/or identity of the uplink component carriers can be conveyed to the user equipment on an as-needed basis. In one example, an eNodeB identifies the particular set of component carriers based on buffer status report (BSR) and the amount of uplink data to be transmitted. The synchronization of the remaining uplink component carriers (or a subset thereof) can introduce additional delays in making the uplink component carriers available for data transmission. However, such a delay is unlikely to have a significant impact on the overall efficiency of user equipment operations. To reduce the impact of the additional synchronization operations, in one example, the scheduler provides a large uplink assignment on a first synchronized uplink component carrier (e.g., the primary uplink component carrier) until the remaining uplink component carriers are synchronized.

In one scenario associated with a contention-based random access procedure, the user equipment may determine that the downlink component carrier associated with the selected uplink component carrier is unreliable. For example, the measurements conducted by the user equipment may reveal that the downlink component carrier is not reliable. In one embodiment, the user equipment can reinitiate the random access procedure on another uplink component carrier with substantially the same timing advance value as the selected (e.g., primary) component carrier. Such a newly selected uplink component carrier is uplink synchronized and is associated with a different downlink component carrier, thereby circumventing the use of the unreliable downlink component carrier.

When an unreliable downlink component carrier is detected, an uplink component carrier with substantially the same timing advance as the primary uplink component carrier may not be available. Moreover, even if an uplink component carrier with substantially the same timing advance value as the primary uplink component carrier is available, the downlink of the newly selected uplink component carrier may be found unreliable. In such situations, the eNodeB can reconfigure the component carriers to designate a new primary uplink component carrier a reliable downlink. Alternatively, the eNodeB can initiate a contention-free random access procedure on a reliable downlink component carrier, indicating a particular uplink component carrier with a downlink response on the reliable component carrier.

In one scenario associated with a contention-based random access procedure, the user equipment may determine that the selected uplink component carrier may is unreliable but that the associated downlink component carrier is reliable. Under such conditions, where the selected uplink component carrier is the primary uplink component carrier, the user equipment, upon its failure to acquire uplink synchronization on the primary component carrier, may declare a radio link failure (RLF). RLF may be appropriate when uplink control information cannot be transmitted. Where the selected uplink component carrier is not the primary uplink component carrier, upon its failure to acquire uplink synchronization on the selected component carrier, the user equipment may attempt a random access procedure on some or all of the remaining uplink component carriers. In one example, the user equipment only initiates the random access procedure on those uplink component carriers that are associated with reliable downlink component carriers. In another example, the user equipment further initiates the random access procedure on all configured component carriers (including the primary uplink component carrier). If all component carriers are exhausted without obtaining uplink synchronization, a radio link failure may be declared.

Figure 11:
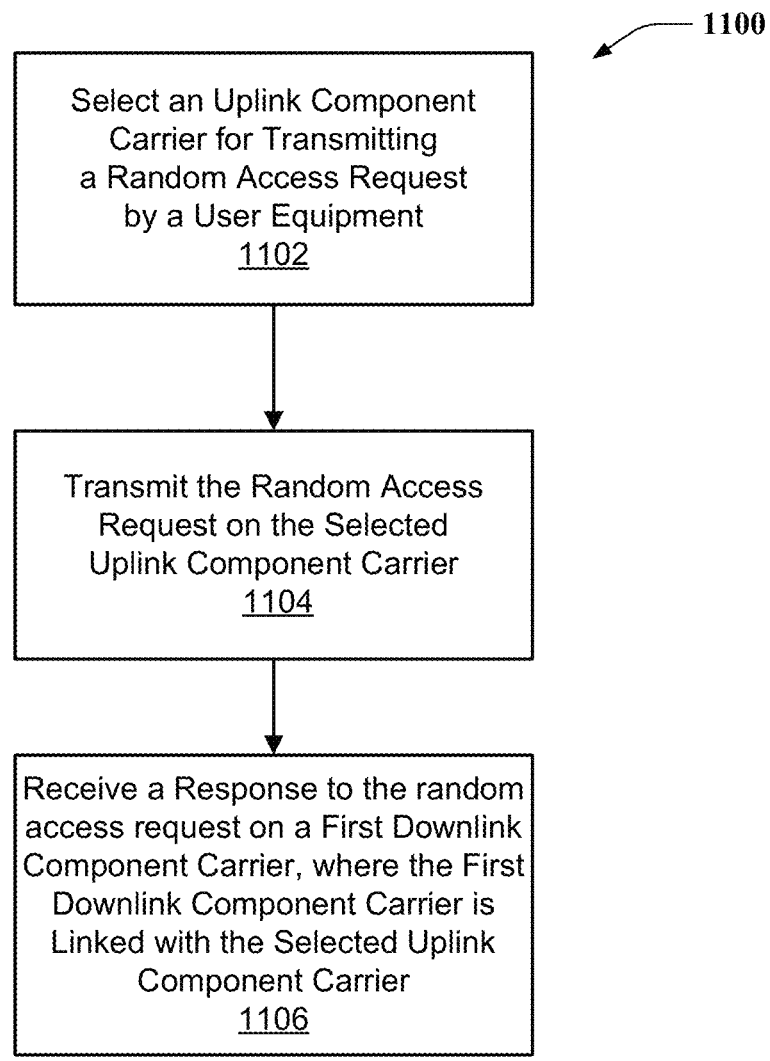
FIG. 11 illustrates a set of exemplary operations to enable a contention-based random access procedure by a user equipment.

FIG. 11 illustrates a set of exemplary operations 1100 that can be carried out to enable a contention-based random access procedure. The operations 1100 of FIG. 11 may be performed by, for example, a user equipment in a wireless communication network. Such a user equipment may be configured to operate with a number of uplink and/or downlink component carriers. At 1102, an uplink component carrier for transmitting a random access request is elected by the user equipment. At 1104, the random access request is transmitted on the selected uplink component carrier. Such a request is received by a network entity, such as an eNodeB. At 1106, a response to the random access request is received by the user equipment. Such a response is received on a first downlink component carrier that is linked to the selected uplink component carrier.

Figure 12:
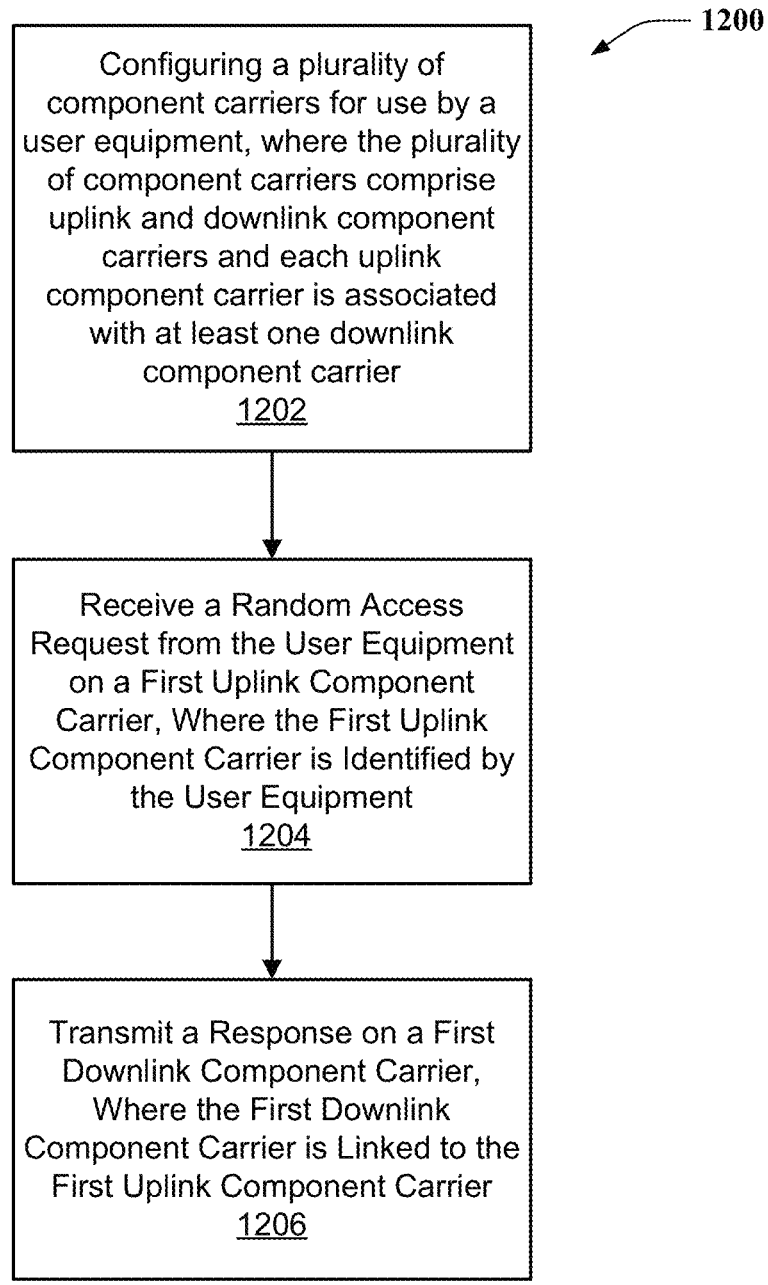
FIG. 12 illustrates a set of exemplary operations to enable a contention-based random access procedure by a wireless network entity.

FIG. 12 illustrates a set of exemplary operations 1200 that can be carried out to enable a contention-based random access procedure. The operations 1200 of FIG. 12 are may be performed by, for example, an eNodeB in a wireless communication network. The eNodeB can be in communication with one or more user equipment in the wireless communication. At 1202, a plurality of component carriers are configured for use by a user equipment. Such component carriers can include uplink and downlink component carriers for which each uplink component carrier is associated with at least one downlink component carrier. At 1204, a random access request is received from a user equipment on a first uplink component carrier, where the first uplink component carrier has been identified by the user equipment. At 1206, a response is transmitted to the user equipment on a first downlink component carrier. The first downlink component carrier can be linked to the first uplink component carrier.

In one example, a primary downlink carrier and an associated uplink primary component carrier are selected for random access operations. Such a linking can be effected through, for example, SIB2 signaling. In this case, the procedure for treating an unreliable downlink component carrier is simplified, as the user equipment can simply declare a radio link failure upon determining that the downlink component carrier is not reliable. Moreover, in a contention-free random access procedure, the need for inclusion of additional indicators for identifying a particular uplink component carrier is diminished.

On the other hand, the selection of a primary downlink component carrier and its associated primary uplink component carrier may warrant additional considerations when utilized in, for example, heterogeneous network (HetNet) deployments. As noted in connection with FIG. 8, in a HetNet deployment, low power cells may be combined with higher power cells to improve network coverage and increase network capacity. In such deployments, the downlink component carriers may not be equivalent from the perspective of each cell, while uplink component carriers can be equivalent. For example, the transmit power level associated with the macrocell can be lower on one downlink component carrier. Under such circumstances, a single downlink component carrier, i.e., the range expansion component carrier, may be used by several user equipment as the primary downlink component carrier. While the use of a single downlink component carrier may be justified due to superior quality of a particular downlink component carrier, it may be desirable to distribute uplink transmissions among different uplink component carriers of similar quality. However, if there is only one uplink component carrier linked (e.g., via SIB2) to the primary downlink component carrier, all user equipment will be mandated to use the same uplink component carrier, leading to data congestion and load imbalance.

In some embodiments, the above-noted issues can be mitigated by implementing a user-equipment-specific linking of downlink and uplink component carriers. The UE-specific linking, which can override the SIB2 linking, allows multiple uplink component carriers to be used by different user equipment (or groups of user equipment). In one example scenario, when a user equipment is first connected to the network, it obtains the SIB2 linking between the downlink and uplink component carriers. However, in a subsequent operation, the eNodeB can reconfigure the component carriers and provide the UE-specific linking for each user equipment.

Figure 13:
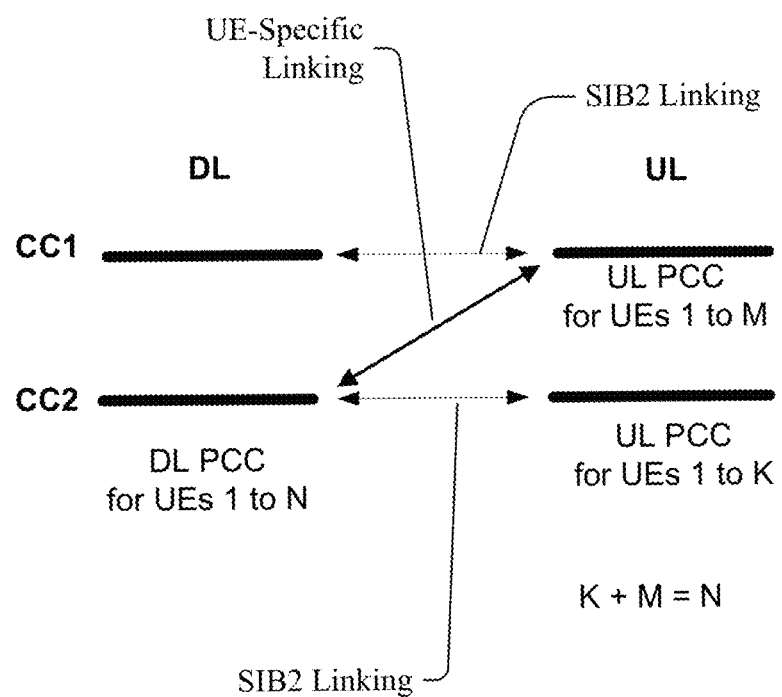
FIG. 13 illustrates an association between uplink and downlink component carriers.

FIG. 13 illustrates an exemplary UE-specific linking. As shown in FIG. 13, a primary downlink component carrier (i.e., DL CC2) can be linked to a first uplink component carrier (i.e., UL CC1) for a first group of user equipment (UEs 1 through M), while a second uplink component carrier (i.e., UL CC2) is linked to a second group of UEs (UEs 1 through K) through SIB2 linking In one example, in the context of the heterogeneous network of FIG. 8, the primary downlink component carrier that is depicted in FIG. 13 is the range expansion component carrier.

The UE-specific linking can override the SIB2 linking for some of the user equipment. Such a new linkage can, however, create ambiguities in a contention-based random access procedure since the eNodeB may not know which particular user equipment initiated the random access process. As such, there may be an ambiguity as to which downlink carrier should be used for sending the response to the random access request. Component-carrier-specific RACH recourses can be defined to resolve this ambiguity. The RACH resources can include, but are not limited to, time, frequency and signature values. In this case, the usage of a particular RACH resources by the user equipment can signal a particular downlink component carrier for the transmission of the response. For example, one uplink component carrier may have RACH resources corresponding to the SIB2-linked downlink component carrier, as well as RACH resources corresponding to range expansion downlink component carrier. The component-carrier-specific RACH resources can be conveyed to the user equipment by dedicated RRC signaling.

Figure 14:
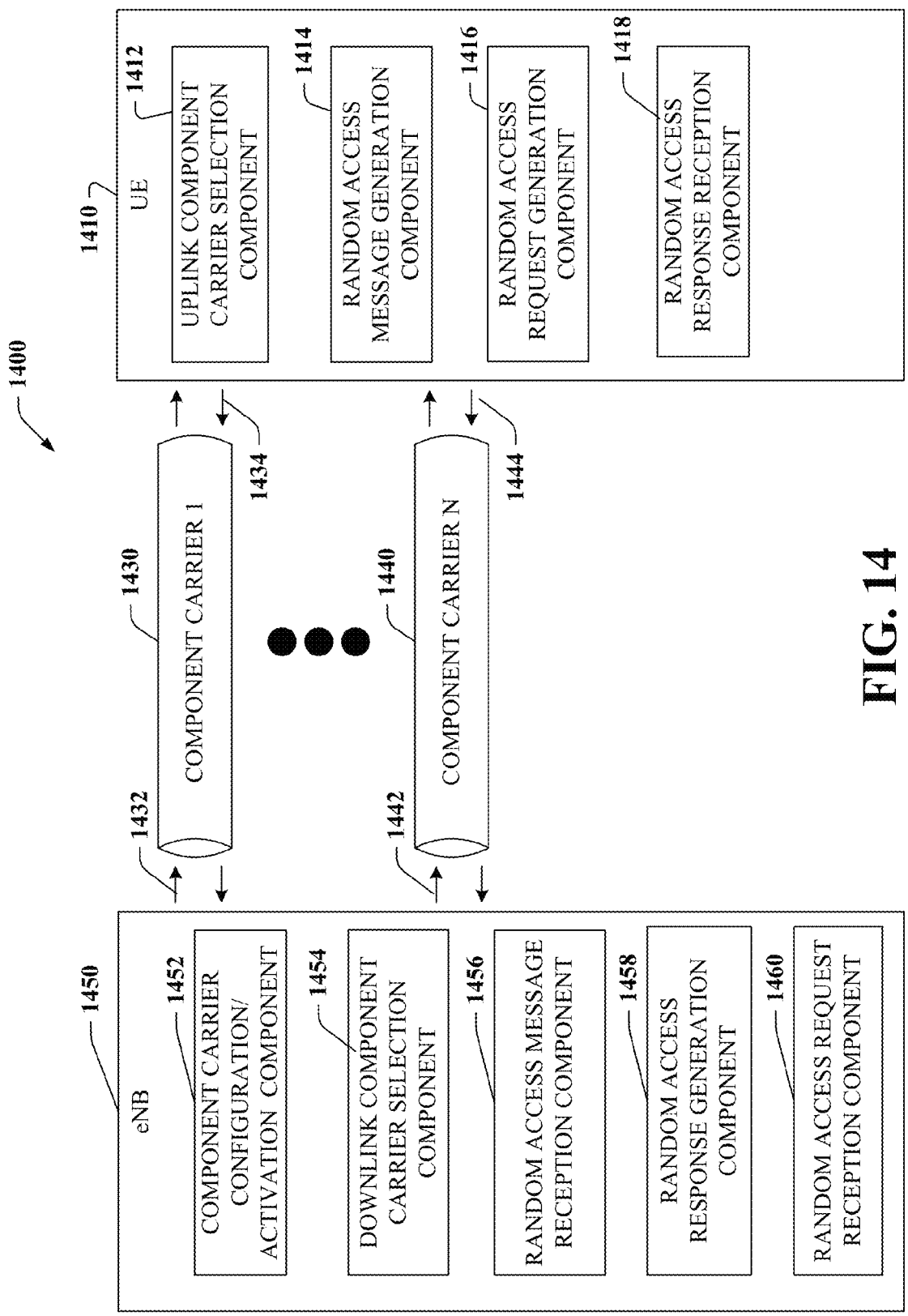
FIG. 14 illustrates a system within which various embodiments according to the present disclosure may be implemented.

FIG. 14 illustrates an exemplary system 1400 capable of supporting the various operations described above. Similar to FIG. 4, the system 1400 includes an eNodeB (eNB) 1450 that can transmit and/or receive information, signals, data, instructions, commands, bits, symbols and the like. FIG. 14 also illustrates a user equipment 1410, that is in communication with the eNB 1450 using "component carrier 1" 1430 through "component carrier N" 1440. The user equipment 1410 can transmit and/or receive information, signals, data, instructions, commands, bits, symbols and the like. Moreover, although not shown, the system 1400 can include additional base stations and/or user equipment.

In some embodiments, the eNB 1450 can include a component carrier configuration/activation component 1452 that enables one or more component carriers to be configured and activated for use by one or more user equipment. The eNB 1450 further includes a downlink component carrier selection component 1454, a random access message reception component 1456, a random access response generation component 1458 and a random access response reception component 1460. The eNB 1450 additionally includes receiving and transmitting components (not shown), which enable the eNB 1450 to transmit signals on downlink 1432, 1442 component carriers and to receive signals on uplink 1434, 1444 component carriers.

The user equipment 1410 of FIG. 14 includes an uplink component carrier selection component 1412, which allows the user equipment 1410 to select an uplink component carrier from among the plurality of component carriers for transmitting a random access message based on an association between the uplink and downlink component carriers. The user equipment 1410 further includes a random access message generation component 1414 that allows the user equipment 1410 to generate a random access message in response to receiving a random access request in a contention-free random access procedure. Additionally, the user equipment 1410 includes a random access request generation component 1416 that allows the user equipment 1410 to generate a random access request in a contention-based random access procedure. The random access response reception component 1418 that is depicted in FIG. 14 enable the user equipment 1410 to receive a random access response. The random access response reception component 1418 can be configured to receive a response in a contention-based random access procedure, and/or in a contention-based random access procedure.

Figure 15:
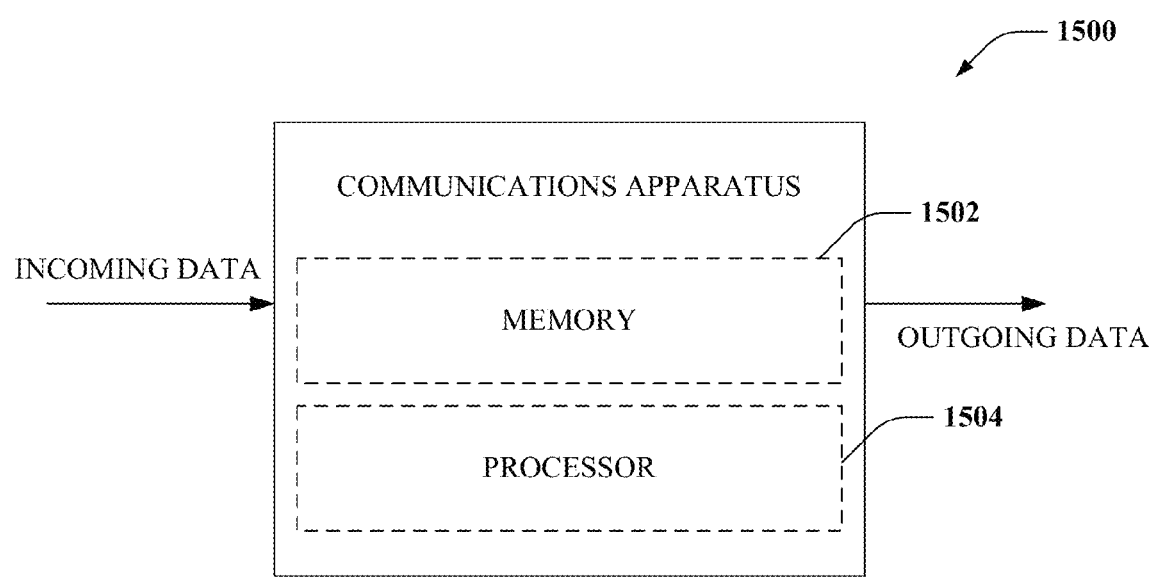
FIG. 15 illustrates an apparatus within which various embodiments according to the present disclosure may be implemented.

FIG. 15 illustrates an apparatus 1500 within which the various disclosed embodiments may be implemented. In particular, the apparatus 1500 that is shown in FIG. 15 may comprise at least a portion of a base station or at least a portion of a user equipment (such as the eNB 1450 and the user equipment 1410 that are depicted in FIG. 14) and/or at least a portion of a transmitter system or a receiver system (such as the transmitter system 210 and the receiver system 250 that are depicted in FIG. 2). The apparatus 1500 that is depicted in FIG. 15 can be resident within a wireless network and receive incoming data via, for example, one or more receivers and/or the appropriate reception and decoding circuitry (e.g., antennas, transceivers, demodulators and the like). The apparatus 1500 that is depicted in FIG. 15 can also transmit outgoing data via, for example, one or more transmitters and/or the appropriate encoding and transmission circuitry (e.g., antennas, transceivers, modulators and the like). Additionally, or alternatively, the apparatus 1500 that is depicted in FIG. 15 may be resident within a wired network.

FIG. 15 further illustrates that the apparatus 1500 can include a memory 1502 that can retain instructions for performing one or more operations, such as signal conditioning, analysis and the like. Additionally, the apparatus 1500 of FIG. 15 may include a processor 1504 that can execute instructions that are stored in the memory 1502 and/or instructions that are received from another device. The instructions can relate to, for example, configuring or operating the apparatus 1500 or a related communications apparatus. It should be noted that while the memory 1502 that is depicted in FIG. 15 is shown as a single block, it may comprise two or more separate memories that constitute separate physical and/or logical units. In addition, the memory while being communicatively connected to the processor 1504, may reside fully or partially outside of the apparatus 1500 that is depicted in FIG. 15. It is also to be understood that one or more components, such as the various components associated with the eNodeB 1450 and the user equipment 1410 that are shown in FIG. 14, can exist within a memory such as memory 1502.

It should be noted that for purposes of simplicity of explanation, the operations in FIGS. 9 through 12 are shown and described as a series of acts. However, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the disclosed embodiments.

It will be appreciated that the memories that are described in connection with the disclosed embodiments can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM) or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM) and direct Rambus RAM (DRRAM).

It should also be noted that the apparatus 1500 of FIG. 15 can be employed with a user equipment or mobile device, and can be, for instance, a module such as an SD card, a network card, a wireless network card, a computer (including laptops, desktops, personal digital assistants PDAs), mobile phones, smart phones or any other suitable terminal that can be utilized to access a network. The user equipment accesses the network by way of an access component (not shown). In one example, a connection between the user equipment and the access components may be wireless in nature, in which access components may be the base station and the user equipment is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA) or any other suitable protocol.

Access components can be an access node associated with a wired network or a wireless network. To that end, access components can be, for instance, a router, a switch and the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

It is to be understood that the embodiments and features that are described herein may be implemented by hardware, software, firmware or any combination thereof. Various embodiments described herein are described in the general context of methods or processes, which may be implemented in one embodiment by a computer program product, embodied in a computer-readable medium, including computer-executable instructions, such as program code, executed by computers in networked environments. As noted above, a memory and/or a computer-readable medium may include removable and non-removable storage devices including, but not limited to, Read Only Memory (ROM), Random Access Memory (RAM), compact discs (CDs), digital versatile discs (DVD) and the like. Therefore, the disclosed embodiments can be implemented on non-transitory computer readable media. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Generally, program modules may include routines, programs, objects, components, data structures, etc., that perform particular tasks or implement particular abstract data types. Computer-executable instructions, associated data structures and program modules represent examples of program code for executing steps of the methods disclosed herein. The particular sequence of such executable instructions or associated data structures represents examples of corresponding acts for implementing the functions described in such steps or processes.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions and so on) that perform the functions described herein. The software codes may be stored in memory units and executed by processors. The memory unit may be implemented within the processor and/or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., user equipment-to-user equipment) ad hoc network systems often using unpaired unlicensed spectrums, 802.xx wireless LAN, BLUETOOTH and any other short- or long-range, wireless communication techniques. The disclosed embodiments can also be used in conjunction with systems that use multiple component carriers. For example, the disclosed embodiments can be used in conjunction with LTE-A systems.

Single carrier frequency division multiple access (SC-FDMA), which utilizes single carrier modulation and frequency domain equalization is a technique that can be utilized with the disclosed embodiments. SC-FDMA has similar performance and essentially a similar overall complexity as those of OFDMA systems. SC-FDMA signal has lower peak-to-average power ratio (PAPR) because of its inherent single carrier structure. SC-FDMA can be utilized in uplink communications where lower PAPR can benefit a user equipment in terms of transmit power efficiency.

Moreover, various aspects or features described herein may be implemented as a method, apparatus or article of manufacture using standard programming and/or engineering techniques. The term "article of manufacture" as used herein is intended to encompass a computer program accessible from any computer-readable device, carrier or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, the ASIC may reside in a user equipment (e.g. 1410 FIG. 14). In the alternative, the processor and the storage medium may reside as discrete components in a user equipment (e.g., 1410 FIG. 14). Additionally, in some embodiments, the steps and/or actions of a method or algorithm may reside as one or any combination or set of codes and/or instructions on a machine readable medium and/or computer readable medium, which may be incorporated into a computer program product.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method for wireless communication, comprising:
   receiving a request for a random access procedure at a user equipment in a wireless communication network, wherein the user equipment is configured to operate with a plurality of component carriers comprising uplink and downlink component carriers of the wireless communication network, wherein the plurality of component carriers include a primary uplink component carrier and one or more secondary uplink component carriers, and wherein the request is received on a first downlink component carrier of the plurality of component carriers;
   selecting an uplink component carrier from among the plurality of component carriers for transmitting a random access message based on an association between the uplink and downlink component carriers, the selecting comprising either (a) selecting an uplink component carrier based on user-equipment specific signaling that links the first downlink component carrier to the selected uplink component carrier, or otherwise, (b) in the absence of user-equipment specific signaling that links the first downlink component carrier to the selected uplink component carrier, selecting an uplink component carrier based on an association between the selected uplink component carrier and the first downlink component carrier as specified by system information block (SIB2) signaling, wherein whether (a) or (b) is used is dependent upon signaling received by the user equipment;
   transmitting the random access message on the selected uplink component carrier; and
   receiving a response to the transmitted random access message.

2. The method of claim 1, wherein selecting an uplink component carrier based on an association between the selected uplink component carrier and the first downlink component carrier as specified by SIB2 signaling comprises selecting the primary uplink component carrier, wherein the association is between the primary uplink component carrier and the first downlink component carrier.

3. The method of claim 1, wherein the first downlink component carrier is associated with the primary uplink component carrier.

4. The method of claim 1, wherein the selected uplink component carrier is a secondary uplink component carrier.

5. The method of claim 4, wherein selecting an uplink component carrier further comprises:
   selecting a secondary uplink component carrier with an uplink timing advance value that is substantially the same as an uplink timing advance value associated with the primary uplink component carrier.

6. The method of claim 4, wherein selecting an uplink component carrier further comprises:
   selecting a secondary uplink component carrier with a different uplink timing advance value than an uplink timing advance value of the primary uplink component carrier; and wherein the method further comprises:
   acquiring uplink synchronization for the primary uplink component carrier to enable proper transmissions of uplink control information.

7. The method of claim 1, wherein
   the request comprises information corresponding to the association between the first downlink component carrier and an indicated uplink component carrier; and
   the selected uplink component carrier is the indicated uplink component carrier.

8. The method of claim 7, wherein receiving the response comprises:
   receiving the response to the transmitted random access message on a second downlink component carrier that is linked to the indicated uplink component carrier in accordance with SIB2 signaling.

9. The method of claim 7, wherein receiving the response comprises:
   receiving the response to the transmitted random access message on the first downlink component carrier.

10. The method of claim 7, wherein the received response is a scrambled response, the method further comprising:
    descrambling the response according to a special signature sequence number or a reserved random access radio network temporary identifier (RA-RNTI) to ascertain a particular uplink component carrier.

11. A method for wireless communication, comprising:
configuring a plurality of component carriers for use by a user equipment in a wireless communication network, wherein the plurality of component carriers comprise uplink and downlink component carriers, the plurality of component carriers including a primary uplink component carrier and one or more secondary uplink component carriers, and wherein each uplink component carrier is associated with at least one downlink component carrier;
selecting a downlink component carrier and transmitting a request for a random access procedure to the user equipment on the selected downlink component carrier;
receiving a random access message from the user equipment on an uplink component carrier of the plurality of component carriers, wherein the uplink component carrier is identified by the user equipment either (a) based on user-equipment-specific signaling that links the selected downlink component carrier to the identified uplink component carrier, or otherwise (b) based on an association between the identified uplink component carrier and the selected downlink component carrier as specified by system information block 2 (SIB2) signaling, wherein whether (a) or (b) is used is dependent upon signaling received by the user equipment; and
transmitting a response to the user equipment.

12. The method of claim 11, wherein
the selected downlink component carrier is the primary downlink component carrier; and
the random access message is received on the primary uplink component carrier.

13. A user equipment, comprising:
a processor; and
a memory, comprising processor executable code which, when executed by the processor, configures the user equipment to:
receive a request for a random access procedure at the user equipment in a wireless communication network, wherein the user equipment is configured to operate with a plurality of component carriers comprising uplink and downlink component carriers of the wireless communication network, the plurality of component carriers including a primary uplink component carrier and one or more secondary uplink component carriers, and wherein the request is received on a first downlink component carrier of the plurality of component carriers;
select an uplink component carrier from among the plurality of component carriers for transmitting a random access message based on an association between the uplink and downlink component carriers, the selecting comprising either (a) selecting an uplink component carrier based on user-equipment specific signaling that links the first downlink component carrier to the selected uplink component carrier, or otherwise, (b) selecting an uplink component carrier based on an association between the selected uplink component carrier and the first downlink component carrier as specified by system information block (SIB2) signaling, wherein whether (a) or (b) is used is dependent upon signaling received by the user equipment;
transmit the random access message on the selected uplink component carrier; and
receive a response to the transmitted random access message.

14. The user equipment of claim 13, wherein the selected uplink component carrier is the primary uplink component carrier.

15. The user equipment of claim 13, wherein the selected uplink component carrier is a secondary uplink component carrier.

16. The user equipment of claim 15, wherein the processor executable code, when executed by the processor, configures the user equipment to select a secondary uplink component carrier with an uplink timing advance value that is substantially the same as an uplink timing advance value associated with the primary uplink component carrier.

17. The user equipment of claim 15, wherein the processor executable code, when executed by the processor, configures the user equipment to
select a secondary uplink component carrier with a different uplink timing advance value than an uplink timing advance value of the primary uplink component carrier; and
to acquire uplink synchronization for the primary uplink component carrier to enable proper transmissions of uplink control information.

18. The user equipment of claim 13, wherein
the request comprises information corresponding to the association between the first downlink component carrier and an indicated uplink component carrier; and
the selected uplink component carrier is the indicated uplink component carrier.

19. The user equipment of claim 18, wherein the processor executable code, when executed by the processor, configures the user equipment to receive the response to the transmitted random access message on a second downlink component carrier that is linked to the indicated uplink component carrier in accordance with SIB2 signaling.

20. The user equipment of claim 18, wherein the processor executable code, when executed by the processor, configures the user equipment to receive the response to the transmitted random access message on the first downlink component carrier.

21. The user equipment of claim 18, wherein
the received response is a scrambled response; and
the processor executable code, when executed by the processor, configures the user equipment to descramble the response according to a special signature sequence number or a reserved random access radio network temporary identifier (RA-RNTI) to ascertain a particular uplink component carrier.

22. A wireless communication device, comprising:
a processor; and
a memory, comprising processor executable code which, when executed by the processor, configures the wireless communication device to:
configure a plurality of component carriers for use by a user equipment in a wireless communication network, wherein the plurality of component carriers comprise uplink and downlink component carriers, the plurality of component carriers including a primary uplink component carrier and one or more secondary uplink component carriers, and wherein each uplink component carrier is associated with at least one downlink component carrier;
select a downlink component carrier and transmit a request for a random access procedure to the user equipment on the selected downlink component carrier;
receive a random access message from the user equipment on an uplink component carrier of the plurality of component carriers, wherein the uplink component carrier is identified by the user equipment either (a) based on user-equipment-specific signaling that links the selected downlink component carrier to the identified uplink component carrier, or otherwise (b) based on an association between the identified uplink component carrier and the selected downlink component carrier as specified by system information block 2 (SIB2) signaling, wherein whether (a) or (b) is used is dependent upon signaling received by the user equipment; and transmit a response to the user equipment.

23. The wireless communication device of claim 22, wherein the selected downlink component carrier is the primary downlink component carrier; and the random access message is received on the primary uplink component carrier.

24. A wireless communication device, comprising:

means for receiving a request for a random access procedure at a user equipment in a wireless communication network, wherein the user equipment is configured to operate with a plurality of component carriers comprising uplink and downlink component carriers of the wireless communication network, wherein the plurality of component carriers include a primary uplink component carrier and one or more secondary uplink component carriers, and wherein the request is received on a first downlink component carrier of the plurality of component carriers;

means for selecting an uplink component carrier from among the plurality of component carriers for transmitting a random access message based on an association between the uplink and downlink component carriers, the selecting comprising either (a) selecting an uplink component carrier based on user-equipment specific signaling that links the first downlink component carrier to the selected uplink component carrier, or otherwise, (b) in the absence of user-equipment specific signaling that links the first downlink component carrier to the selected uplink component carrier, selecting an uplink component carrier based on an association between the selected uplink component carrier and the first downlink component carrier as specified by system information block (SIB2) signaling, wherein whether (a) or (b) is used is dependent upon signaling received by the user equipment;

means for transmitting the random access message on the selected uplink component carrier; and means for receiving a response to the transmitted random access message.

25. A wireless communication device, comprising:

means for configuring a plurality of component carriers for use by a user equipment in a wireless communication network, wherein the plurality of component carriers comprise uplink and downlink component carriers, wherein the plurality of component carriers include at least one primary uplink component carrier and one or more secondary component carriers, and wherein each uplink component carrier is associated with at least one downlink component carrier;

means for selecting a downlink component carrier;

means for transmitting a request for a random access procedure to the user equipment on the selected downlink component carrier;

means for receiving a random access message from the user equipment on an uplink component carrier of the plurality of component carriers, wherein the uplink component carrier is identified by the user equipment either (a) based on user-equipment-specific signaling that links the selected downlink component carrier to the identified uplink component carrier, or otherwise (b) in the absence of user-equipment specific signaling that links the first downlink component carrier to the selected uplink component carrier, based on an association between the identified uplink component carrier and the selected downlink component carrier as specified by system information block 2 (SIB2) signaling, wherein whether (a) or (b) is used is dependent upon signaling received by the user equipment; and means for transmitting a response to the user equipment.

26. A computer program product, embodied on a non-transitory computer-readable medium, comprising:

program code for receiving a request for a random access procedure at a user equipment in a wireless communication network, wherein the user equipment is configured to operate with a plurality of component carriers comprising uplink and downlink component carriers of the wireless communication network, wherein the plurality of component carriers includes a primary uplink component carrier and one or more secondary uplink component carriers, and wherein the request is received on a first downlink component carrier of the plurality of component carriers;

program code for selecting an uplink component carrier from among the plurality of component carriers for transmitting a random access message based on an association between the uplink and downlink component carriers, the selecting comprising either (a) selecting an uplink component carrier based on user-equipment specific signaling that links the first downlink component carrier to the selected uplink component carrier, or otherwise, (b) in the absence of user-equipment specific signaling that links the first downlink component carrier to the selected uplink component carrier, selecting an uplink component carrier based on an association between the selected uplink component carrier and the first downlink component carrier as specified by system information block (SIB2) signaling, wherein whether (a) or (b) is used is dependent upon signaling received by the user equipment;

program code for transmitting the random access message on the selected uplink component carrier; and program code for receiving a response to the transmitted random access message.

27. A computer program product, embodied on a non-transitory computer-readable medium, comprising:

program code for configuring a plurality of component carriers for use by a user equipment in a wireless communication network, wherein the plurality of component carriers comprise uplink and downlink component carriers, wherein the plurality of component carriers include a primary uplink component carrier and one or more secondary uplink component carriers, and wherein each uplink component carrier is associated with at least one downlink component carrier;

program code for selecting a downlink component carrier and program code for transmitting a request for a random access procedure to the user equipment on the selected downlink component carrier;

program code for receiving a random access message from the user equipment on an uplink component carrier of the plurality of component carriers, wherein the uplink component carrier is identified by the user equipment based on either (a) user-equipment-specific signaling that links the selected downlink component carrier to the selected uplink component carrier, or otherwise, (b) in the absence of user-equipment specific signaling that links the first downlink component carrier to the selected uplink component carrier, based on an association between the selected uplink component carrier and the selected downlink component carrier as specified by system information block 2 (SIB2) signaling, wherein whether (a) or (b) is used is dependent upon signaling received by the user equipment; and program code for transmitting a response to the user equipment.

28. A method for wireless communication, comprising:
selecting an uplink component carrier for transmitting a random access request by a user equipment in a wireless communication network, wherein the user equipment is configured to operate with a plurality of component carriers comprising uplink and downlink component carriers, wherein the plurality of component carriers include a primary uplink component carrier and one or more secondary uplink component carriers;
transmitting the random access request on the selected uplink component carrier; and
receiving a response to the random access request on a first downlink component carrier in the plurality of component carriers, wherein the first downlink component carrier is linked with the selected uplink component carrier either (a) based on user-equipment specific signaling that links the first downlink component carrier to the selected uplink component carrier, or otherwise, (b) in the absence of user-equipment specific signaling that links the first downlink component carrier to the selected uplink component carrier, based on an association between the selected uplink component carrier and the first downlink component carrier as specified by system information block (SIB2)) signaling, wherein whether (a) or (b) is used is dependent upon signaling received by the user equipment.

29. The method of claim 28, wherein the user equipment is configured to use a random access channel on the selected uplink component carrier.

30. The method of claim 28, wherein selecting the uplink component carrier comprises identifying the first downlink component carrier in an active subset of the plurality of component carriers configured for use by the user equipment.

31. The method of claim 28, wherein the user equipment identifies the first downlink component carrier in accordance with a random access channel (RACH) resource selected from a group consisting of:
a time resource;
a frequency resource; and
a signature space resource.

32. The method of claim 28, wherein
the selected uplink component carrier is the primary uplink component carrier; and
the first downlink component carrier is the primary downlink component carrier.

33. The method of claim 28, wherein
the selected uplink component carrier is the primary uplink component carrier; and
the first downlink component carrier is a secondary downlink component carrier.

34. The method of claim 28, wherein selecting the uplink component carrier comprises selecting a secondary uplink component carrier with substantially the same uplink timing advance value as the primary uplink component carrier.

35. The method of claim 33, further comprising:
acquiring uplink synchronization for each secondary uplink component carrier within an active subset of the plurality of component carriers configured for use by the user equipment when an uplink timing advance value associated with said each secondary uplink component carrier is different from an uplink timing advance value associated with the primary uplink component carrier.

36. The method of claim 33, further comprising:
acquiring uplink synchronization for a one or more secondary uplink component carriers within an active subset of the plurality of component carriers configured for use by the user equipment when an uplink timing advance value associated with the one or more secondary uplink component carriers is different from the uplink timing advance value associated with the primary uplink component carrier, and
wherein the one or more secondary uplink component carriers are identified by an entity in the wireless network other than the user equipment.

37. The method of claim 28, wherein the selected uplink component carrier is the primary uplink component carrier, the method further comprising:
determining that the first downlink carrier is not reliable; and
selecting a secondary uplink component carrier with substantially the same uplink timing advance value as the primary uplink component carrier for the transmission of the random access request.

38. The method of claim 28, wherein
the selected uplink component carrier is the primary uplink component carrier;
the first downlink carrier is not reliable, and
further comprising receiving an indication of a new primary uplink component carrier, associated with a reliable downlink component carrier.

39. The method of claim 28, wherein the selected uplink component carrier is the primary uplink component carrier, the method further comprising:
determining that the first downlink carrier is not reliable; and
receiving a contention-free random access request on a reliable downlink component carrier, the contention-free random access request comprising an indication as to an association between the primary uplink component carrier and the reliable downlink component carrier.

40. The method of claim 28, wherein the selected uplink component carrier is the primary uplink component carrier, the method further comprising:
declaring a radio link failure when the primary uplink component carrier is detected as being unreliable.

41. The method of claim 28, further comprising:
selecting a secondary uplink component carrier for transmitting the random access request.

42. The method of claim 41, wherein
determining that the selected uplink component carrier is unreliable;
determining that the first downlink component carrier is reliable; and
acquiring uplink synchronization for an uplink component carrier that is linked to the first downlink component carrier.

43. The method of claim 41, wherein
determining that the selected uplink component carrier is unreliable;
determining that the first downlink component carrier is reliable; and
attempting to acquire uplink synchronization for each uplink component carrier within an active subset of the plurality of component carriers configured for use by the user equipment in an iterative manner until uplink synchronization for at least one uplink component carrier is successfully attained.

44. The method of claim 43, further comprising declaring a radio link failure if none of the attempts to acquire uplink synchronization are successful.

45. A method for wireless communication, comprising:
configuring a plurality of component carriers for use by a user equipment in a wireless communication network, wherein the plurality of component carriers comprise uplink and downlink component carriers, wherein the plurality of component carriers include a primary uplink component carrier and one or more secondary uplink component carriers, and wherein each uplink component carrier is associated with at least one downlink component carrier;
receiving a random access request from the user equipment on a first uplink component carrier of the plurality of component carriers, wherein the first uplink component carrier is identified by the user equipment, the user equipment identifying the first uplink component carrier by either (a) selecting the first uplink component carrier based on user-equipment specific signaling that links the first downlink component carrier to the identified uplink component carrier, or otherwise, (b) in the absence of user-equipment specific signaling that links the first downlink component carrier to the selected uplink component carrier, selecting the first uplink component carrier based on an association between the first uplink component carrier and the first downlink component carrier as specified by system information block (SIB2) signaling, wherein whether (a) or (b) is used is dependent upon signaling received by the user equipment;
transmitting a response on a first downlink component carrier of the plurality of component carriers, wherein the first downlink component carrier is linked to the first uplink component carrier.

46. A user equipment, comprising:
a processor; and
a memory, comprising processor executable code, which when executed by the processor, configures the user equipment to:
select an uplink component carrier for transmitting a random access request by the user equipment from a plurality of component carriers comprising uplink and downlink component carriers, wherein the plurality of component carriers include a primary uplink component carrier and one or more secondary uplink component carriers;
transmit the random access request on the selected uplink component carrier; and
receive a response to the random access request on a first downlink component carrier in the plurality of component carriers, wherein the first downlink component carrier is linked with the selected uplink component carrier either (a) based on user-equipment specific signaling that links the first downlink component carrier to the selected uplink component carrier, or otherwise, (b) in the absence of user-equipment specific signaling that links the first downlink component carrier to the selected uplink component carrier, based on an association between the selected uplink component carrier and the first downlink component carrier as specified by system information block (SIB2) signaling, wherein whether (a) or (b) is used is dependent upon signaling received by the user equipment.

47. The user equipment of claim 46, wherein the user equipment is configured to use a random access channel on the selected uplink component carrier.

48. The user equipment of claim 46, wherein the processor executable code, when executed by the processor, configures the user equipment to select the uplink component carrier by identifying the first downlink component carrier from an active subset of the plurality of component carriers configured for use by the user equipment.

49. The user equipment of claim 46, wherein the processor executable code, when executed by the processor, configures the user equipment to identify the first downlink component carrier in accordance with a random access channel (RACH) resource selected from a group consisting of:
a time resource;
a frequency resource; and
a signature space resource.

50. The user equipment of claim 46, wherein
the selected uplink component carrier is the primary uplink component carrier; and
the first downlink component carrier is the primary downlink component carrier.

51. The user equipment of claim 46, wherein
the selected uplink component carrier is the primary uplink component carrier; and
the first downlink component carrier is a secondary downlink component carrier.

52. The user equipment of claim 46, wherein the processor executable code, when executed by the processor, configures the user equipment to select a secondary uplink component carrier with substantially the same uplink timing advance value as the primary uplink component carrier.

53. The user equipment of claim 51, wherein the processor executable code, when executed by the processor, further configures the user equipment to:
acquire uplink synchronization for each secondary uplink component carrier within an active subset of the plurality of component carriers configured for use by the user equipment when the uplink timing advance value associated with each secondary uplink component carrier is different from the uplink timing advance value associated with the primary uplink component carrier.

54. The user equipment of claim 51, wherein the processor executable code, when executed by the processor, further configures the user equipment to:
acquire uplink synchronization for a one or more secondary uplink component carriers within an active subset of the plurality of component carriers configured for use by the user equipment when the uplink timing advance value associated with of the one or more secondary uplink component carriers is different from the uplink timing advance value associated with the primary uplink component carrier, and
wherein the one or more secondary uplink component carriers are identified by an entity in the wireless network other than the user equipment.

55. The user equipment of claim 46, wherein
the selected uplink component carrier is the primary uplink component carrier;
the first downlink carrier is not reliable; and
the processor executable code, when executed by the processor, configures the user equipment to newly select a secondary uplink component carrier with substantially the same uplink timing advance value as for transmitting the random access request.

56. The user equipment of claim 46, wherein
the selected uplink component carrier is the primary uplink component carrier;
the first downlink carrier is not reliable; and
a new primary uplink component carrier, associated with a reliable downlink component carrier, is configured for the user equipment.

57. The user equipment of claim 46, wherein
the selected uplink component carrier is the primary uplink component carrier;
the first downlink carrier is not reliable; and
the processor executable code, when executed by the processor, configures the user equipment to receive a contention-free random access request on a reliable downlink component carrier, the request comprising an indication as to an association between the primary uplink component carrier and the reliable downlink component carrier.

58. The user equipment of claim 46, wherein
the selected uplink component carrier is the primary uplink component carrier; and
the processor executable code, when executed by the processor, configures the user equipment to declare a radio link failure when the primary uplink component carrier is unreliable.

59. The user equipment of claim 46, wherein the processor executable code, when executed by the processor, configures the user equipment to select a secondary uplink component carrier for transmitting the random access request.

60. The user equipment of claim 59, wherein
the selected uplink component carrier is determined to be unreliable;
the first downlink component carrier is determined to be reliable; and
the processor executable code, when executed by the processor, further configures the user equipment to acquire uplink synchronization for an uplink component carrier that is linked to the first downlink component carrier.

61. The user equipment of claim 58, wherein
the selected uplink component carrier is determined to be unreliable;
the first downlink component carrier is determined to be reliable; and
the processor executable code, when executed by the processor, configures the user equipment to acquire uplink synchronization for each uplink component carrier within an active subset of the plurality of component carriers configured for use by the user equipment until uplink synchronization for at least one uplink component carrier is successfully attained.

62. The user equipment of claim 61, wherein the processor executable code, when executed by the processor, configures the user equipment to declare a radio link failure if none of the synchronization acquisition attempts are successful.

63. A device, comprising:
a processor; and
a memory, comprising processor executable code, which when executed by the processor, configures the device to:
configure a plurality of component carriers for use by a user equipment in a wireless communication network, wherein the plurality of component carriers comprise uplink and downlink component carriers, wherein the plurality of component carriers comprise a primary uplink component carrier and one or more secondary uplink component carriers, and wherein each uplink component carrier is associated with at least one downlink component carrier;
receive a random access request from the user equipment on a first uplink component carrier of the plurality of component carriers, wherein the first uplink component carrier is identified by the user equipment;
transmit a response on a first downlink component carrier of the plurality of component carriers, wherein the first downlink component carrier is linked to the first uplink component carrier either (a) based on user-equipment specific signaling that links the first downlink component carrier to the first uplink component carrier, or otherwise, (b) in the absence of user-equipment specific signaling that links the first downlink component carrier to the selected uplink component carrier, based on an association between the first uplink component carrier and the first downlink component carrier as specified by system information block (SIB2) signaling, wherein whether (a) or (b) is used is dependent upon signaling received by the user equipment.

64. A device, comprising:
means for selecting an uplink component carrier for transmitting a random access request by a user equipment in a wireless communication network, wherein the user equipment is configured to operate with a plurality of component carriers comprising uplink and downlink component carriers, wherein the plurality of component carriers include a primary uplink component carrier and one or more secondary uplink component carriers;
means for transmitting the random access request on the selected uplink component carrier; and
means for receiving a response to the random access request on a first downlink component carrier in the plurality of component carriers, wherein the first downlink component carrier is linked with the selected uplink component carrier either (a) based on user-equipment specific signaling that links the first downlink component carrier to the selected uplink component carrier, or otherwise, (b) in the absence of user-equipment specific signaling that links the first downlink component carrier to the selected uplink component carrier, based on an association between the selected uplink component carrier and the first downlink component carrier as specified by system information block (SIB2) signaling, wherein whether (a) or (b) is used is dependent upon signaling received by the user equipment.

65. A wireless communication device, comprising:
means for configuring a plurality of component carriers for use by a user equipment in a wireless communication network, wherein the plurality of component carriers comprise uplink and downlink component carriers, wherein the plurality of component carriers include a primary uplink component carrier and one or more secondary uplink component carriers, and wherein each uplink component carrier is associated with at least one downlink component carrier;
means for receiving a random access request from the user equipment on a first uplink component carrier of the plurality of component carriers, wherein the first uplink component carrier is identified by the user equipment;
means for transmitting a response on a first downlink component carrier of the plurality of component carriers, wherein the first downlink component carrier is linked to the first uplink component carrier either (a) based on user-equipment specific signaling that links the first downlink component carrier to the first uplink component carrier, or otherwise, (b) in the absence of user-equipment specific signaling that links the first downlink component carrier to the selected uplink component carrier, based on an association between the first uplink component carrier and the first downlink component carrier as specified by system information block (SIB2) signaling, wherein whether (a) or (b) is used is dependent upon signaling received by the user equipment.

66. A computer program product, embodied on a non-transitory computer-readable medium, comprising:
   program code for selecting an uplink component carrier for transmitting a random access request by a user equipment in a wireless communication network, wherein the user equipment is configured to operate with a plurality of component carriers comprising uplink and downlink component carriers, the plurality of component carriers including a primary uplink component carrier and one or more secondary uplink component carriers;
   program code for transmitting the random access request on the selected uplink component carrier; and
   program code for receiving a response to the random access request on a first downlink component carrier in the plurality of component carriers, wherein the first downlink component carrier is linked with the selected uplink component carrier either (a) based on user-equipment specific signaling that links the first downlink component carrier to the first uplink component carrier, or otherwise, (b) in the absence of user-equipment specific signaling that links the first downlink component carrier to the selected uplink component carrier, based on an association between the first uplink component carrier and the first downlink component carrier as specified by system information block (SIB2) signaling, wherein whether (a) or (b) is used is dependent upon signaling received by the user equipment.

67. A computer program product, embodied on a non-transitory computer-readable medium, comprising:
   program code for configuring a plurality of component carriers for use by a user equipment in a wireless communication network, wherein the plurality of component carriers comprise uplink and downlink component carriers, wherein the plurality of component carriers include a primary component carrier and one or more secondary component carriers, and wherein each uplink component carrier is associated with at least one downlink component carrier;
   program code for receiving a random access request from the user equipment on a first uplink component carrier of the plurality of component carriers, wherein the first uplink component carrier is identified by the user equipment;
   program code for transmitting a response on a first downlink component carrier of the plurality of component carriers, wherein the first downlink component carrier is linked to the first uplink component carrier either (a) based on user-equipment specific signaling that links the first downlink component carrier to the first uplink component carrier, or otherwise, (b) in the absence of user-equipment specific signaling that links the first downlink component carrier to the selected uplink component carrier, based on an association between the first uplink component carrier and the first downlink component carrier as specified by system information block (SIB2) signaling, wherein whether (a) or (b) is used is dependent upon signaling received by the user equipment.

* * * * *